United States Patent [19]
Allan

[11] Patent Number: 5,555,608
[45] Date of Patent: Sep. 17, 1996

[54] CONNECTOR APPARATUS WITH NESTING RIDGES

[76] Inventor: Robert M. Allan, 1631 Colgate Cir., La Jolla, Calif. 92037

[21] Appl. No.: 229,825

[22] Filed: Apr. 19, 1994

Related U.S. Application Data

[63] Continuation-in-part of Ser. No. 5,331, Jan. 15, 1993, Pat. No. 5,345,659, which is a continuation-in-part of Ser. No. 787,424, Nov. 12, 1991, Pat. No. 5,179,767, which is a continuation-in-part of Ser. No. 553,258, Jul. 16, 1990, Pat. No. 5,088,162.

[51] Int. Cl.$^6$ .............................. A43B 7/00; A44B 11/00; B65D 63/00
[52] U.S. Cl. ........................... 24/442; 24/16 PB; 24/306; 24/587; 36/88
[58] Field of Search .............................. 24/442, 450, 452, 24/399, 400, 16 PB, 17 AP, 30.5 P, 304, 306, 577, 587; 383/63, 65; 36/88

[56] References Cited

U.S. PATENT DOCUMENTS

| | | |
|---|---|---|
| Re. 14,762 | 11/1919 | Springer . |
| Re. 24,613 | 3/1959 | Hageltorn . |
| 410,447 | 9/1889 | Rich . |
| 495,775 | 4/1893 | Bonnamy . |
| 772,412 | 10/1904 | Garrett et al. . |
| 983,093 | 1/1911 | Svenson . |
| 1,330,737 | 2/1920 | Coffman . |
| 1,620,574 | 3/1927 | Savage . |
| 1,751,926 | 3/1930 | Kielberg . |
| 1,912,180 | 5/1933 | Cornell . |
| 2,144,755 | 1/1939 | Freedman . |
| 2,249,764 | 7/1941 | Hothersall . |
| 2,499,898 | 3/1950 | Anderson . |
| 2,693,875 | 11/1954 | Chaffee . |
| 2,766,814 | 10/1956 | Sedlacek . |
| 2,780,946 | 2/1957 | McGuire . |
| 2,841,850 | 7/1958 | Zahorski . |
| 2,979,119 | 4/1961 | Kramer . |
| 2,994,117 | 8/1961 | McMullin . |
| 3,009,235 | 11/1961 | De Mestral . |
| 3,015,869 | 1/1962 | Rapata . |
| 3,020,613 | 2/1962 | Morin . |
| 3,038,225 | 6/1962 | Ausnit . |
| 3,060,611 | 10/1962 | D'Andrea . |
| 3,066,366 | 12/1962 | Wyckoff et al. . |
| 3,078,532 | 2/1963 | Bywater . |
| 3,083,737 | 4/1963 | De Mestral . |
| 3,101,517 | 8/1963 | Fox et al. . |
| 3,141,221 | 7/1964 | Faulls, Jr. . |
| 3,147,528 | 9/1964 | Erb . |
| 3,192,589 | 7/1965 | Pearson . |

(List continued on next page.)

FOREIGN PATENT DOCUMENTS

| | | |
|---|---|---|
| 1232367 | 10/1960 | France . |
| 2213686 | 10/1972 | Germany . |
| 3726618 | of 1989 | Germany . |
| 5-95804 | of 1993 | Japan . |
| 376328 | 5/1964 | Switzerland . |
| 898124 | 6/1962 | United Kingdom . |
| 1078193 | 8/1967 | United Kingdom . |
| 1161406 | 8/1969 | United Kingdom . |
| 2074461 | of 1981 | United Kingdom . |

*Primary Examiner*—Victor N. Sakran
*Attorney, Agent, or Firm*—William W. Haefliger

[57] ABSTRACT

A connector means including shoe connector means comprising a plurality of improved ridges configured using an improved injection mold design so that inverted ridge means may be nested between and gripped by certain of the ridges. The connector means also includes means to confirm complete, adjusted interlock of the nested ridges. Additionally disclosed are products that would incorporate such connector means. Also disclosed is improved, chisel-like, ridge hook design suitable for strong connectors with little or no mechanical resistance to connection. Improved, generally rectangular, rigid, ridge design for toy building blocks is also disclosed. Also disclosed is improved hook for hook and loop fasteners with connector members suitable for injection molding. An injector mold design suitable for manufacturing ridge-type connectors or hook-type connectors for hook and loop connectors is disclosed. Also disclosed is an improved, adjustable tongue and double-buckle connector for straps.

67 Claims, 11 Drawing Sheets

U.S. PATENT DOCUMENTS

| | | |
|---|---|---|
| 3,247,848 | 4/1966 | Mathison . |
| 3,263,292 | 8/1966 | Fekete . |
| 3,266,113 | 8/1966 | Flanagan, Jr. . |
| 3,312,583 | 4/1967 | Rochlis . |
| 3,338,285 | 8/1967 | Jaster . |
| 3,347,298 | 10/1967 | Ausnit et al. . |
| 3,353,662 | 11/1967 | Pickin . |
| 3,364,530 | 1/1968 | Kraus . |
| 3,372,442 | 3/1968 | Ishimatsu . |
| 3,403,429 | 10/1968 | Smith . |
| 3,408,705 | 11/1968 | Kayser et al. . |
| 3,410,327 | 11/1968 | Ausnit . |
| 3,416,991 | 12/1968 | Yoshimura . |
| 3,494,244 | 2/1970 | Wayland . |
| 3,514,815 | 6/1970 | Evans . |
| 3,518,727 | 7/1970 | Eberle et al. . |
| 3,534,780 | 10/1970 | Hockmeyer et al. . |
| 3,546,754 | 12/1970 | Erb . |
| 3,572,191 | 3/1971 | Bannies . |
| 3,592,428 | 7/1971 | McFarlane . |
| 3,600,027 | 8/1971 | Noland et al. . |
| 3,611,620 | 10/1971 | Perry . |
| 3,619,913 | 11/1971 | Albrecht . |
| 3,620,896 | 11/1971 | Glasgow . |
| 3,633,787 | 1/1972 | Katz . |
| 3,648,404 | 3/1972 | Ogsbury et al. . |
| 3,653,099 | 4/1972 | Hoffman . |
| 3,654,052 | 4/1972 | Rye . |
| 3,686,718 | 8/1972 | Brumlik . |
| 3,708,833 | 1/1973 | Ribich et al. . |
| 3,735,449 | 5/1973 | Rosales . |
| 3,758,657 | 9/1973 | Menzin et al. . |
| 3,762,000 | 10/1973 | Menzin et al. . |
| 3,808,646 | 5/1974 | Brumlik . |
| 3,808,648 | 5/1974 | Billarant et al. . |
| 3,808,649 | 5/1974 | Ausnit . |
| 3,900,652 | 8/1975 | Uraya et al. . |
| 4,073,090 | 2/1978 | Lucia . |
| 4,147,007 | 4/1979 | Eppich . |
| 4,169,303 | 10/1979 | Lemelson . |
| 4,290,174 | 9/1981 | Kalleberg . |
| 4,322,875 | 4/1982 | Brown et al. . |
| 4,502,194 | 3/1985 | Morris et al. . |
| 4,557,024 | 12/1985 | Roberts et al. . |
| 4,614,630 | 9/1986 | Pluim, Jr. . |
| 4,674,778 | 6/1987 | Ruiz . |
| 4,727,659 | 3/1988 | Walker . |
| 4,794,028 | 12/1988 | Fischer . |
| 4,872,242 | 10/1989 | Allan . |
| 4,872,243 | 10/1989 | Fischer . |
| 4,910,362 | 3/1990 | Kinner . |
| 4,947,525 | 8/1990 | Van Erden . |
| 4,947,527 | 8/1990 | Hennig . |
| 4,984,339 | 1/1991 | Provost et al. . |
| 5,070,584 | 12/1991 | Dais et al. . |
| 5,088,162 | 2/1992 | Allan . |
| 5,113,599 | 5/1992 | Cohen et al. . |
| 5,158,767 | 10/1992 | Cohen et al. . |
| 5,179,767 | 1/1993 | Allan . |
| 5,253,435 | 10/1993 | Auger et al. ................................ 36/88 |
| 5,344,296 | 9/1994 | Laninga . |
| 5,383,290 | 1/1995 | Grim . |

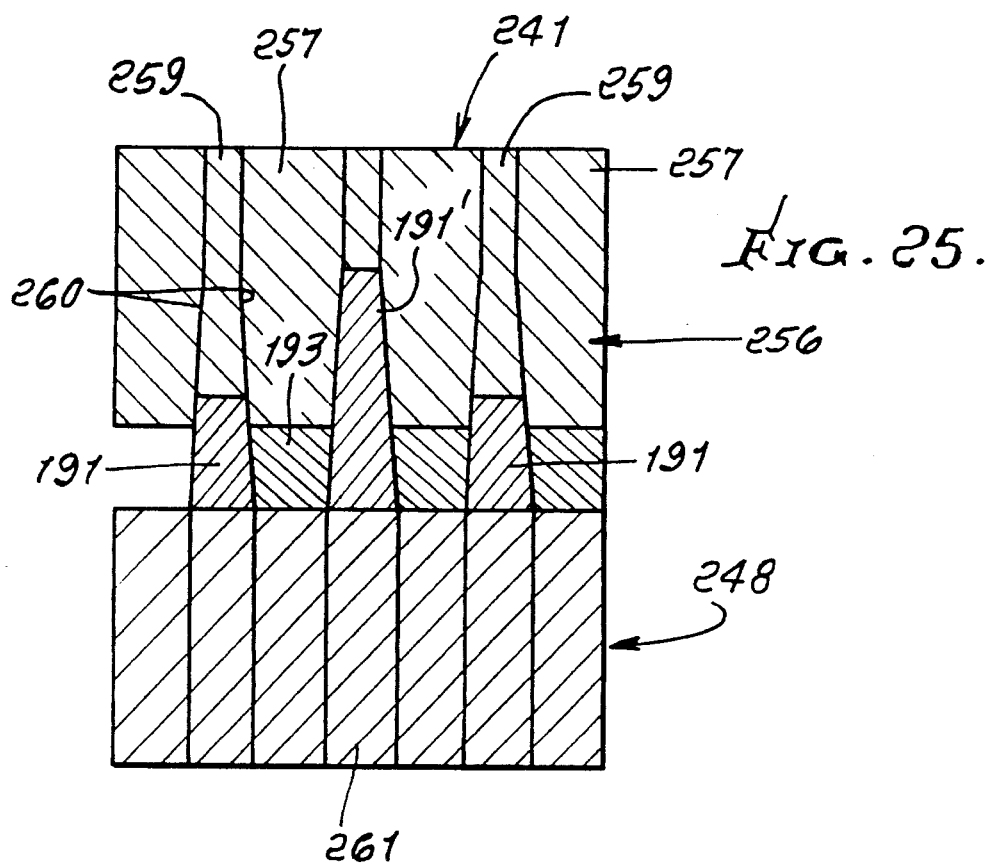
FIG. 25.
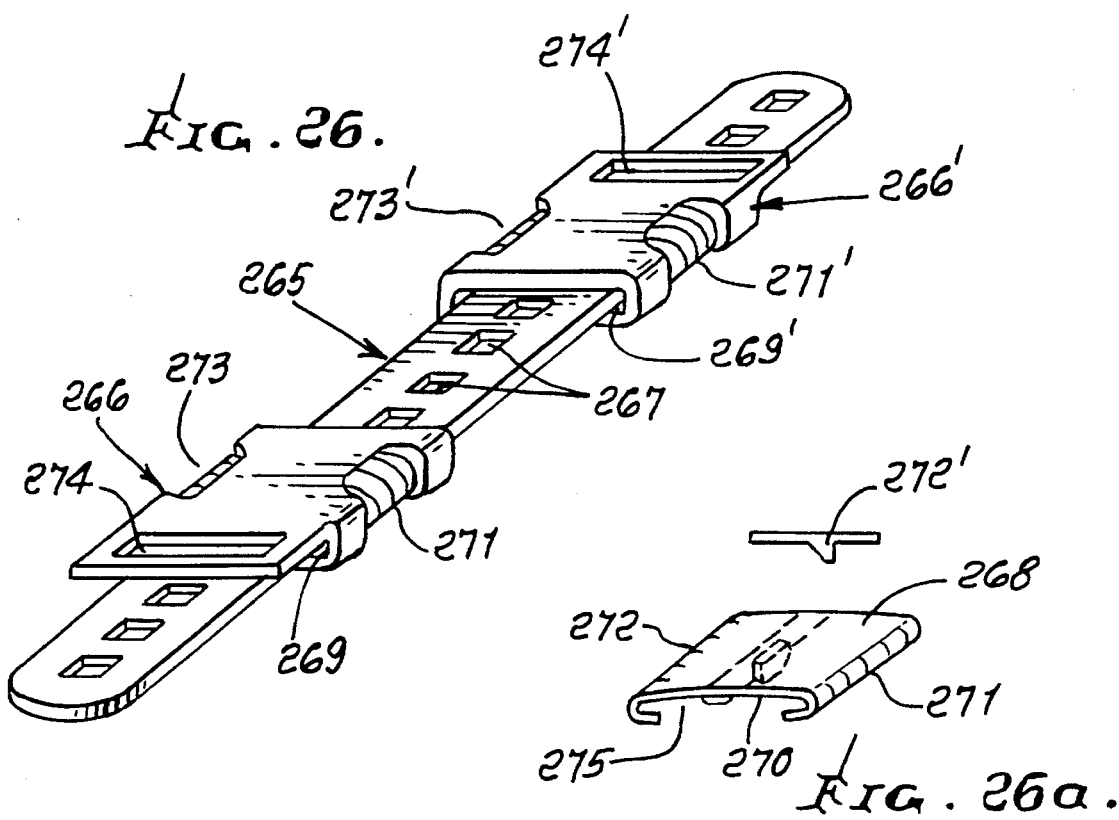
FIG. 26.
FIG. 26a.

CONNECTOR APPARATUS WITH NESTING RIDGES

This application is a continuation-in-part of Ser. No. 08/005,331 filed Jan. 15, 1993, now U.S. Pat. No. 5,345,659, which is a continuation-in-part of Ser. No. 787,424 filed Nov. 12, 1991, now U.S. Pat. No. 5,179,767, which is a continuation-in-part of Ser. No. 553,258 filed Jul. 16, 1990, now U.S. Pat. No. 5,088,162, and all of which are incorporated herein by reference.

BACKGROUND OF THE INVENTION

The referenced application Ser. No. 553,258 relates generally to an elongated, strap-like connector, with generally C-shaped cross sections configured to nest ridges of an opposing strap end. Also, random sections of the strap-like connector were provided that may be affixed to objects so as to allow their connection. Teeth might be added to control lateral movement of the nested ridges in the C-shaped openings. Means to confirm interlock was also disclosed and claimed.

Certain improvements to the invention were claimed in referenced application Ser. No. 787,424. One major improvement was the combining of the larger and smaller ridges, so that the connector consisted of one cross section configuration, instead of two. If used on a small strap, each side of the strap could be looped and connected to the same side or the opposite side. The flexing of the ridges allowed the simultaneous nesting of a series of ridges, even though their outer, cross section widths were greater than the openings they would be inserted into.

Additional improvements to the invention were claimed in referenced application Ser. No. 08/005,331 filed Jan. 15, 1993. One such improvement was a flexible, hook-like, tapered ridge suitable for vertical removal from a mold, due to its ability to straighten. The tapered, flexible design allowed for a more complicated connector. Virtually an unlimited number of rows or clusters of ridges could be positioned, both laterally and longitudinally. Previously, only one or two rows of ridges, using an injection mold, were practical, without using a relatively expensive and complicated mold. The improved, flexible, hook-type ridge disclosed herein gains its shear strength in number of connections, and may be used as an alternative to hook-and-loop type connectors.

The herein disclosed injection mold design can be modified to make a flexible connector with improved hooks, for hook-and-loop type connectors. Provost, in U.S. Pat. No. 4,984,339, discloses a hook, for hook-and-loop fasteners, which has a base intimately engaging a substantially planar base member and in which the hook tapers smoothly and continuously from the base member to the free end. That hook design, when manufactured in accordance with U.S. Pat. No. 4,872,243 to Fisher, can result in a continuous strip or roller-molded connector with hooks thereon. The planar base member can be approximately 0.010 inches thick, which provides for good flexibility. This thin base may not be commercially achievable using a conventional injection mold process.

It would be desirable to use a conventional injection mold to manufacture a connector with improved hooks, for hook-and loop connectors, wherein the connector is flexible, yet with a base thick enough to allow the hot liquid plastic to flow in the mold during forming. Typically, the connector claimed by Fisher may be sold to manufacturers who re-manufacture it into desired shapes to fit their needs. It would be desirable to many manufacturers to be able to purchase a connector with improved hooks, for hook-and-loop connections, where the connector was flexible and formed exactly to their specifications through conventional injection molding.

With certain types of connectors, such as shoe connectors, it is desirable to have individual ridges with a great deal of shear strength. Individual, flexible, and tapered ridges lack a great deal of shear strength. Also, it would be desirable if a shoe strap or other strap could be joined with little or no pressure. In addition, a shoe strap would be easier to use, if the ridges were recessed within the strap. Many of the ridge designs previously disclosed flexed during connection, which, for certain applications, required greater mechanical pressure than desirable.

Loosely fitted, generally inflexible or flexible ridge-to-ridge type connectors, hereinafter disclosed, can have ease of connection and disconnection, while having far greater shear strength than the previously disclosed tapered, flexible, ridge-type connectors, and enable more versatile designs than previously possible, when produced by means of the improved injection mold design hereinafter disclosed.

There is also need for improved, easy to connect, ridge-to-ridge and hook-to-loop type connectors that lend themselves to the injection mold process.

SUMMARY OF THE INVENTION

The present invention includes provision for a plurality of improved ridges configured and spaced to nest inverted ridge means, incorporated into a strap-like shoe connector. Other connectors are disclosed which also are of an improved design suitable for the improved injection mold design herein disclosed.

The disclosures in herein applicant's U.S. patent applications, Ser. No. 787,464, and Ser. No. 553,258, provided for C-shaped cross sections formed by the side walls of ridges of a strap-like shoe connector. The ridges had a strap-like base, typically a narrow, flexible midsection, and an outermost portion with hook-like cross sections. In the present invention, the base or center of the C-shaped cross section is missing.

It is an object of this invention to enable up to 40 or more rows of ridges, per inch, to be incorporated onto a product's surface, so that such surface appears relatively flat, yet has small, lateral, and longitudinal perforations partially or fully through the surface.

It is yet another object of this invention that the ridges may have variable cross sections, depending upon the intended use, which may be generally flexible or inflexible, rounded, oblong, hooked, tapered, angular, parallel, sloping, pointed, or chisel-like on one or both sides or ends of a ridge. The variable cross sections may be used to assist ridge nesting based on the intended use of the product to be connected. A connector may have differently configured ridges.

It is a further object of this invention that loosely nesting ridges, configured for ease of connection/disconnection of objects, may incorporate a means to control their lateral engagement, such as staggered groupings of ridges or rows of ridges with individual ridges laterally not aligned.

It is another object of this invention that grooves and/or ridges running perpendicular to the ridges may be used to control lateral engagement of ridges.

It is an additional object of this invention that certain ridges need not nest or contact the side walls of a plurality of other ridges to achieve interlock of the connector means, but that the connector means still has means to achieve complete interlock.

It is an object of this invention that a connector strap, such as for a shoe, may have ridges substantially recessed between two outer, strap-like members suitable to receive raised ridges into the openings between the recessed ridges.

It is an object of this invention that a connector may have ridges placed between two more outer, strap-like connector members, with said ridges partially or fully recessed, and with single or multiple hook-like projections on said ridges.

It is an object of this invention that a partially inflated bladder be added to a shoe; and that a connector be positioned on the shoe so that, when tightened, pressure is applied to the surface of the bladder, which in turn increases the internal pressure of the bladder, which in turn tightens the shoe fit.

Yet another object is the provision of a connector means connectible to inverted ridge means and comprising:

a) a plurality of parallel ridges spaced apart and configured so that the inverted ridge means may be nested between and gripped by certain of the parallel ridges, b) and including means associated with the connector means to confirm completed, adjusted interlock of the inverted ridge means with the parallel ridges in response to the nesting, c) and including an object to which the connector means is connected.

It is an added object of this invention that a connector means may have ridges with single or multiple hook-like cross sections, with hooks having chisel-like cross sections, the space between two ridges located, to allow the insertion of a similar configured ridge, substantially without mechanically spreading the two ridges further apart, so that connection of connector parts occurs with minimal mechanical resistance.

It is yet another object of this invention to employ relatively simple, injection-type molds for forming strong, flexible or relatively inflexible ridges with the undercut outer, terminus portion of a ridge being formed by a protrusion from one mold part, while the nonundercut portion of said ridge being formed by a cavity of the other mold part.

It is an object of this invention that the improved ridge configuration may be incorporated into previous disclosures of the patents and applications of which this application is a continuation-in-part.

It is yet another object of this invention that the term shoe and shoe connector, as used herein, means and is applicable to baby shoes and boots, canvas, leather, and synthetic foot apparel, including sports and recreational shoes, high-top shoes, boots, and the like.

It is an additional object of this invention that one specification for ridges with hook-like termini provides for an average cross section width as small as approximately 0.008 inches, to achieve desired flexibility.

It is an object of this invention that a strap-like connector may have ratchet-like ridges, the connector configured to provide ratchet-like tightening when pulled across another connector part and wherein the strap-like connector's ratchet connection is to be confirmed by a C-shaped connector means.

It is an object of this invention that the improved ridge design, suitable for manufacture in the improved, disclosed injection mold plate forming cavities, may be substantially modified by employing a thinner mold plate with scribe-forming cavities, which would substantially shorten laterally the ridges, so as to form instead a hook suitable to engage a loop, such as for hook and loop connector. It is understood that said hooks would require several additional modifications, such as spacing, alignment, and thickness, for desired strength, etc. It is an object of this invention that the mold design (in a form for manufacture of ridge connectors or for hook connectors) have at least two mold parts, which at least join at the terminus of the hook, so as to allow air to vent, so that a well-defined, pointed hook terminus can be achieved.

U.S. Pat. No. 5,179,767 claimed an improved buckle which allowed ratchet-like tightening of a tongue that flexibly fit into said buckle; the buckle and tongue would in turn be connected to a strap. It is another object of this invention to provide for an improved, double-ended tongue, connectible to a pair of buckles to provide an improved, adjustable connection.

These and other objects and advantages of the invention, as well as the details of an illustrative embodiment, will be more fully understood from the following specification and drawings, in which:

DRAWING DESCRIPTION

Figure 10:
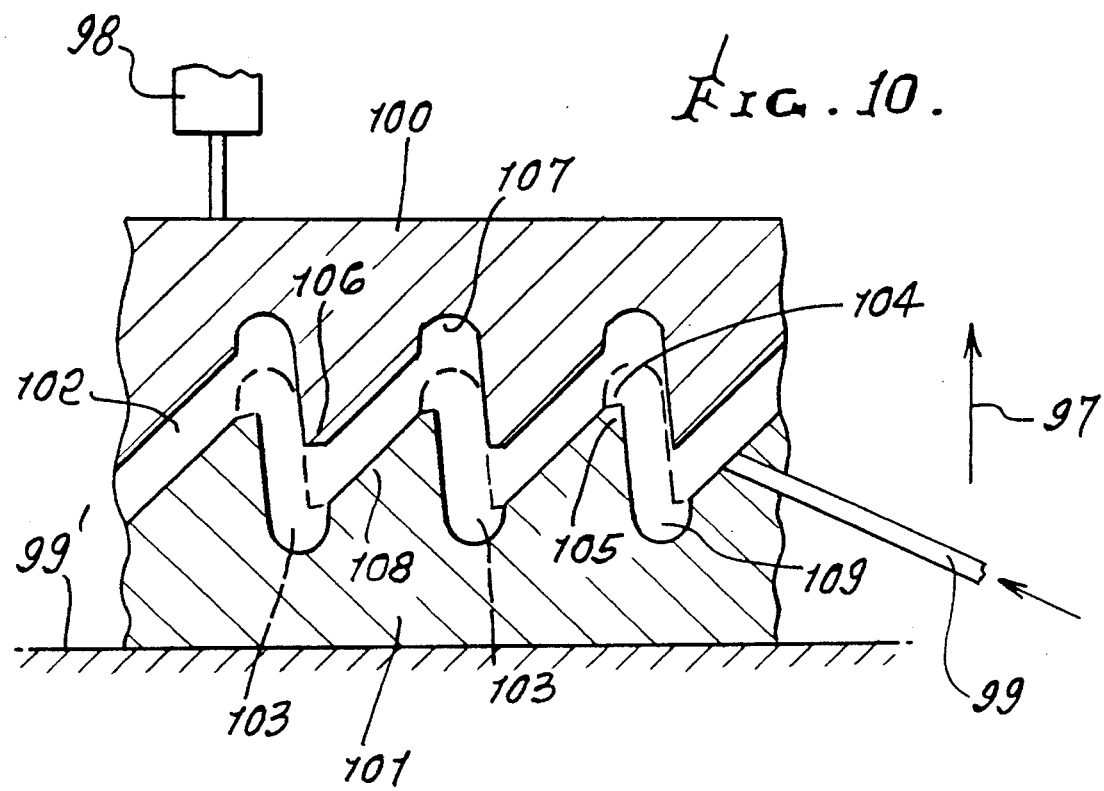
FIG. 10 is a section taken through two mold parts.
Figure 13:
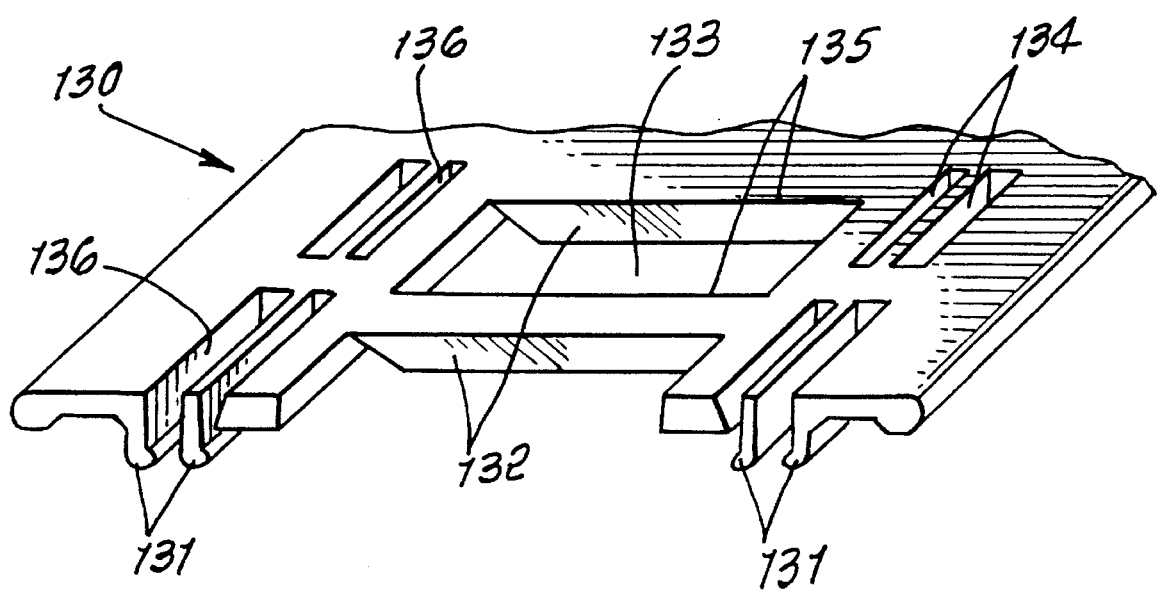
Figure 14:
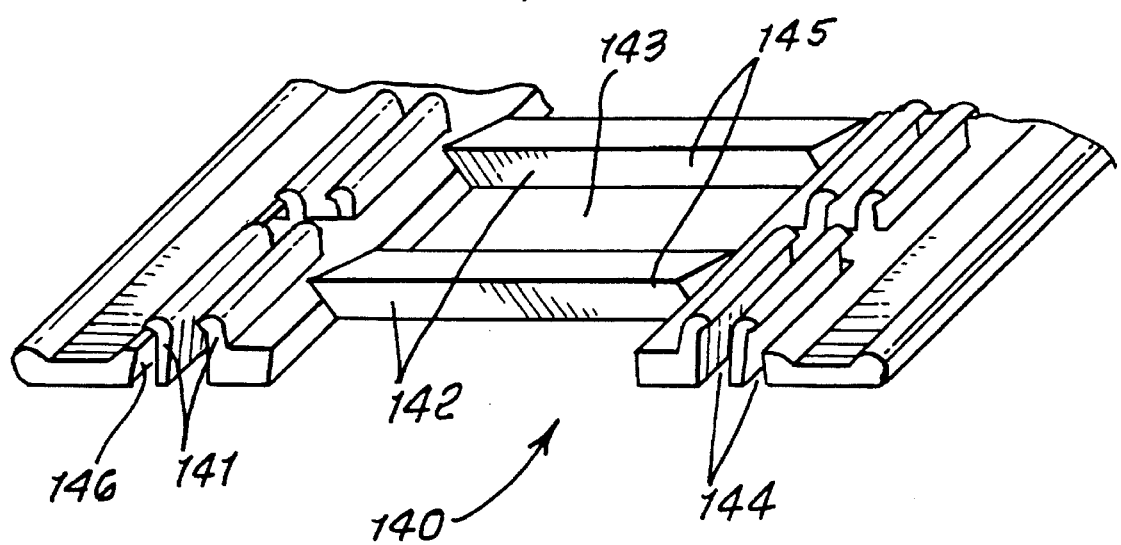
Figure 15:
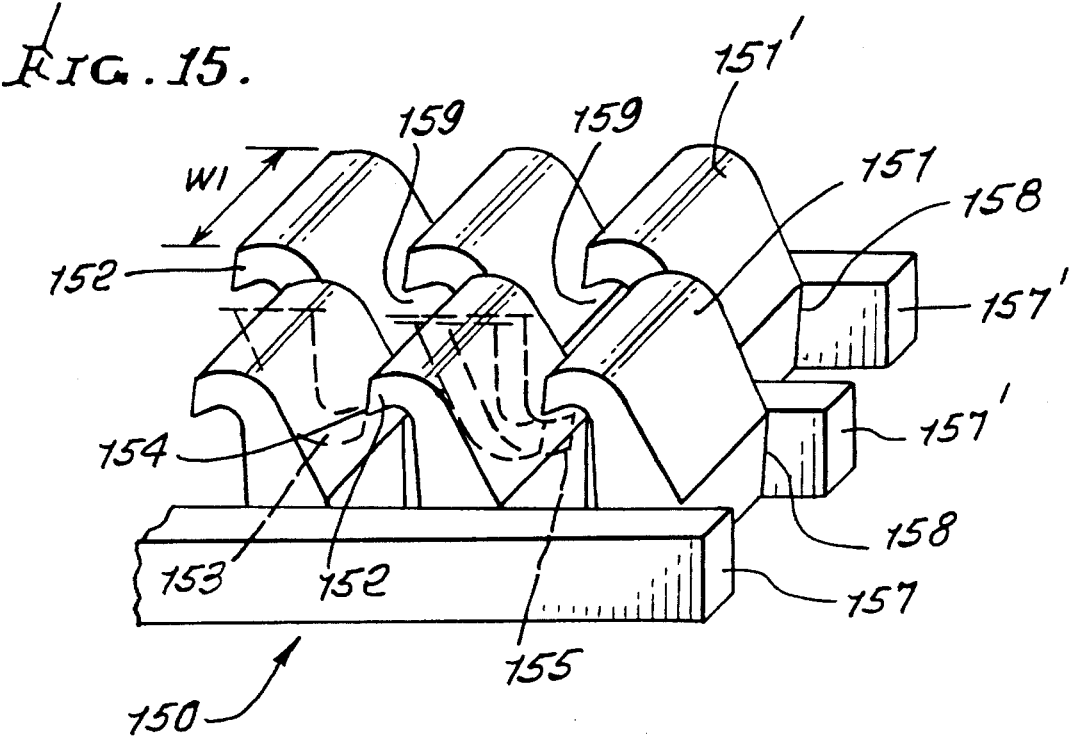
Figure 16:
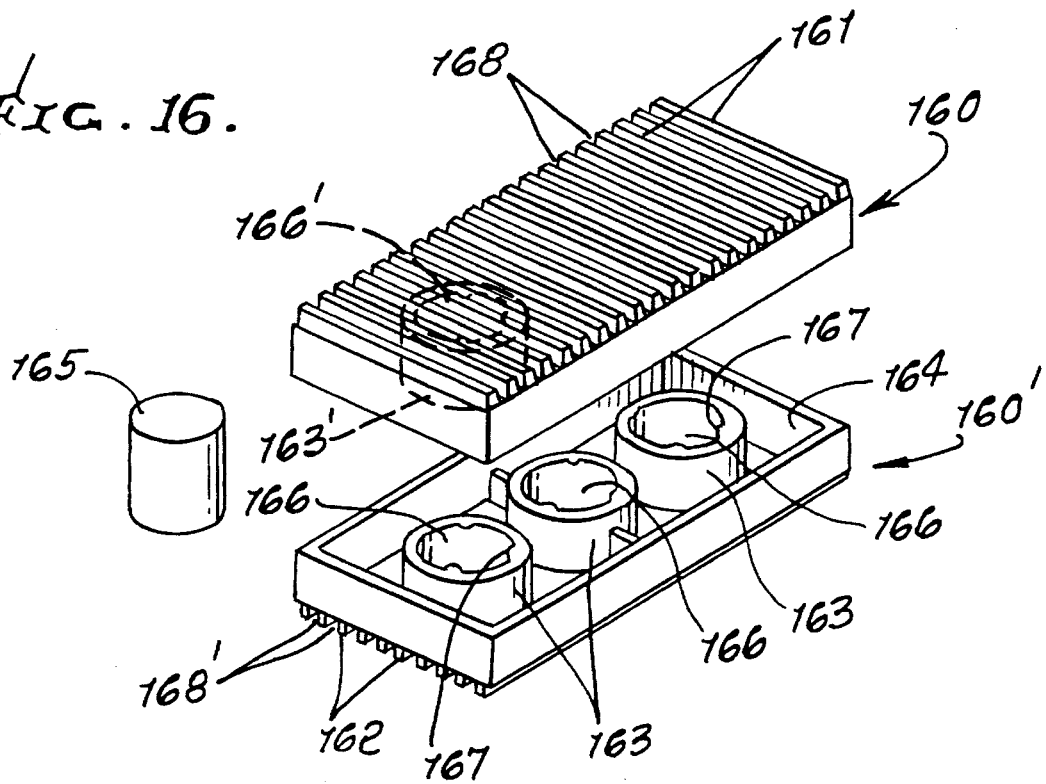
Figure 17:
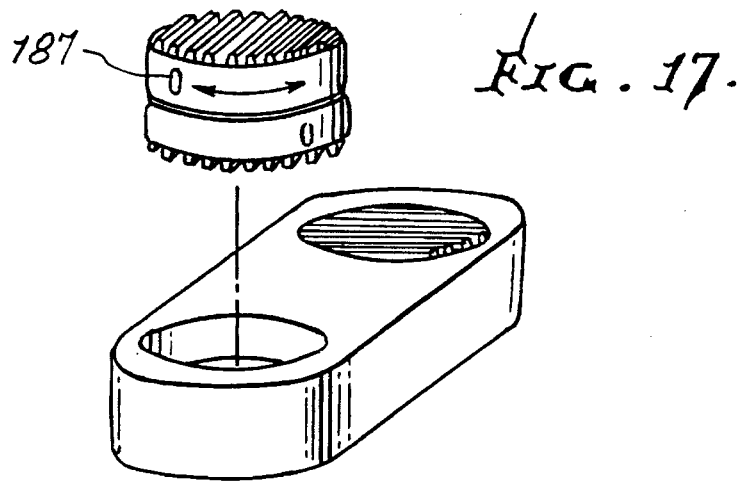
Figure 18:
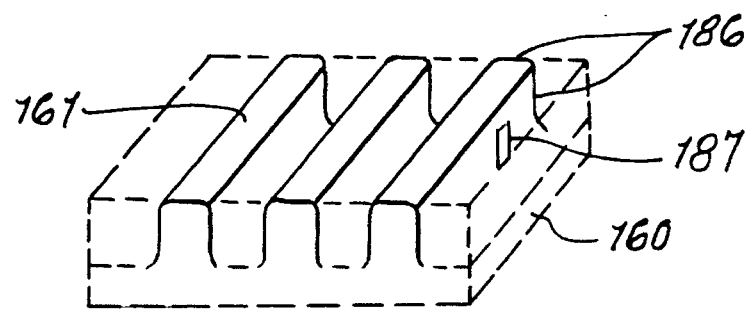
Figure 19:
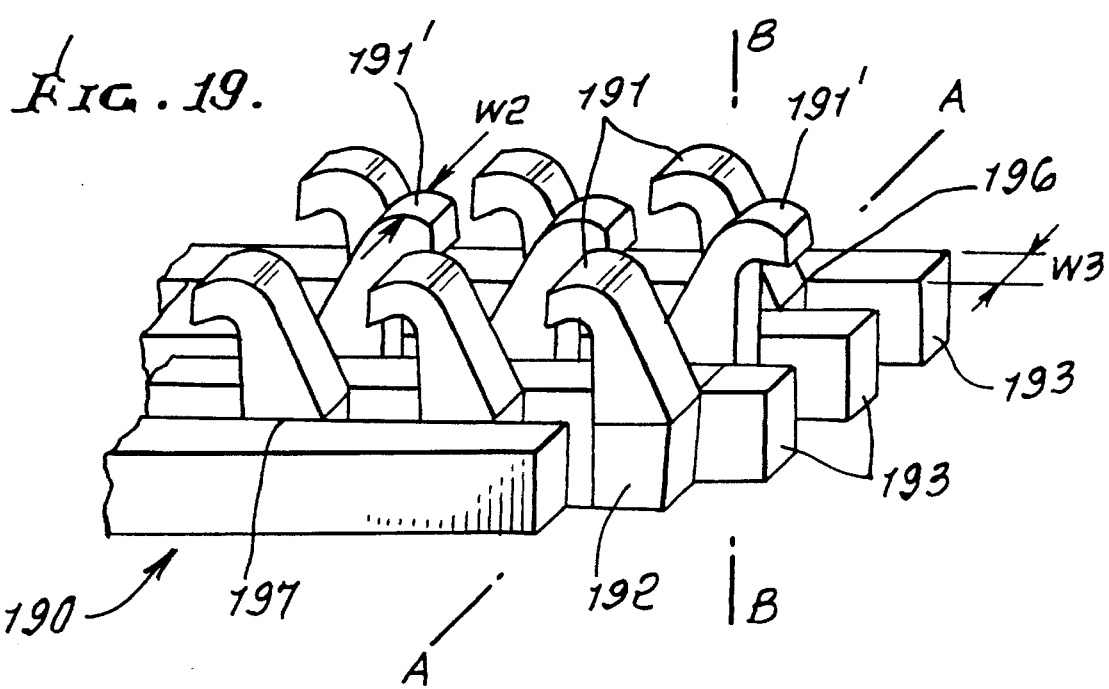
Figure 20:
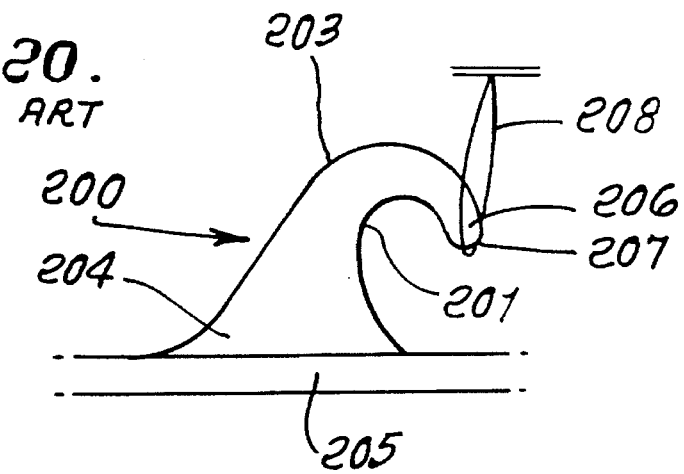
Figure 21A:
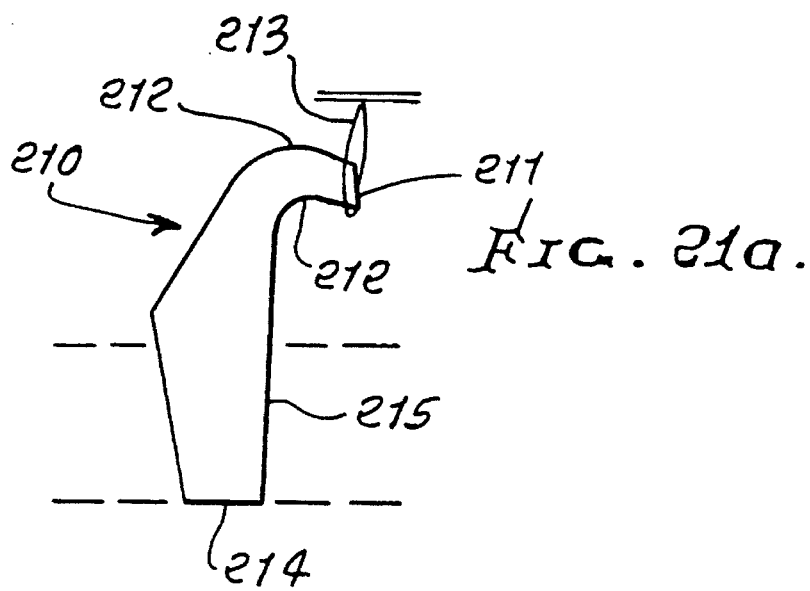
Figure 21B:
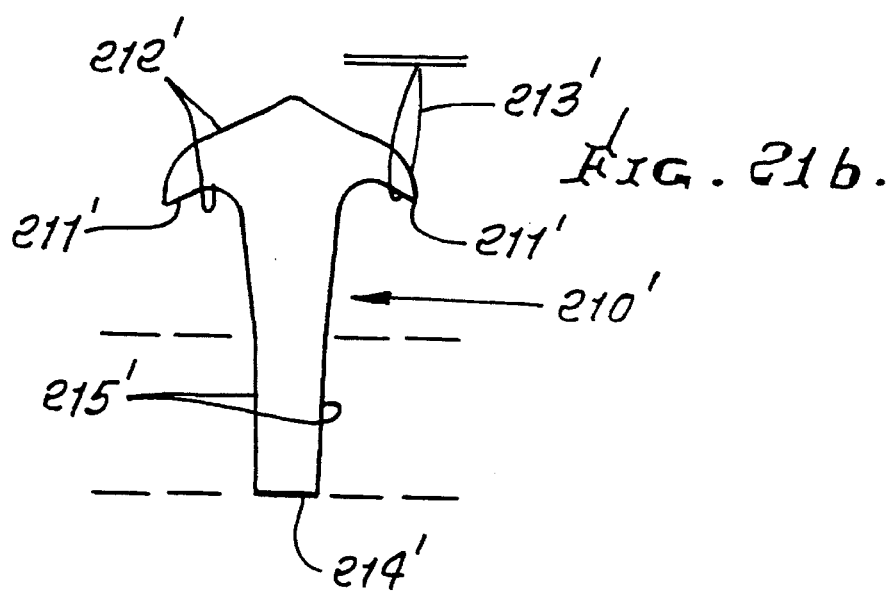
Figure 22:
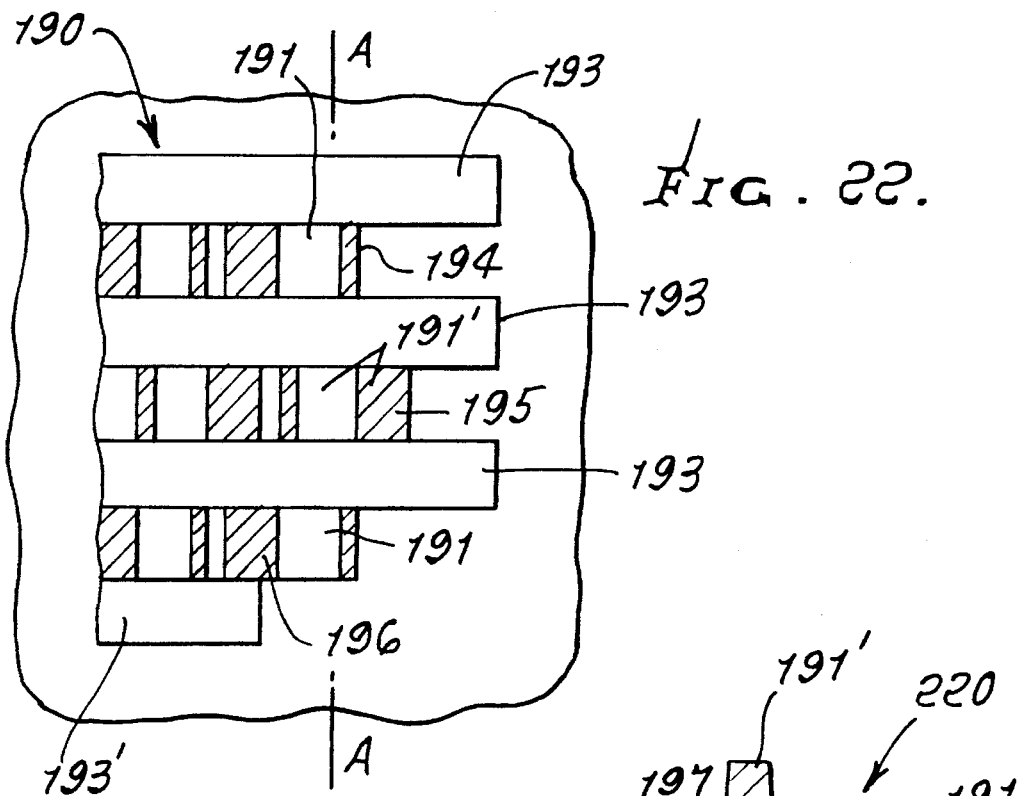
Figure 23:
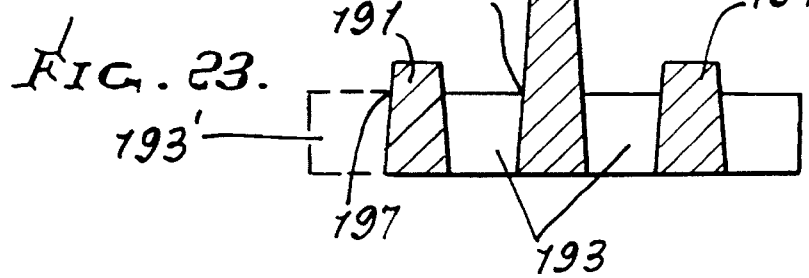
Figure 24:
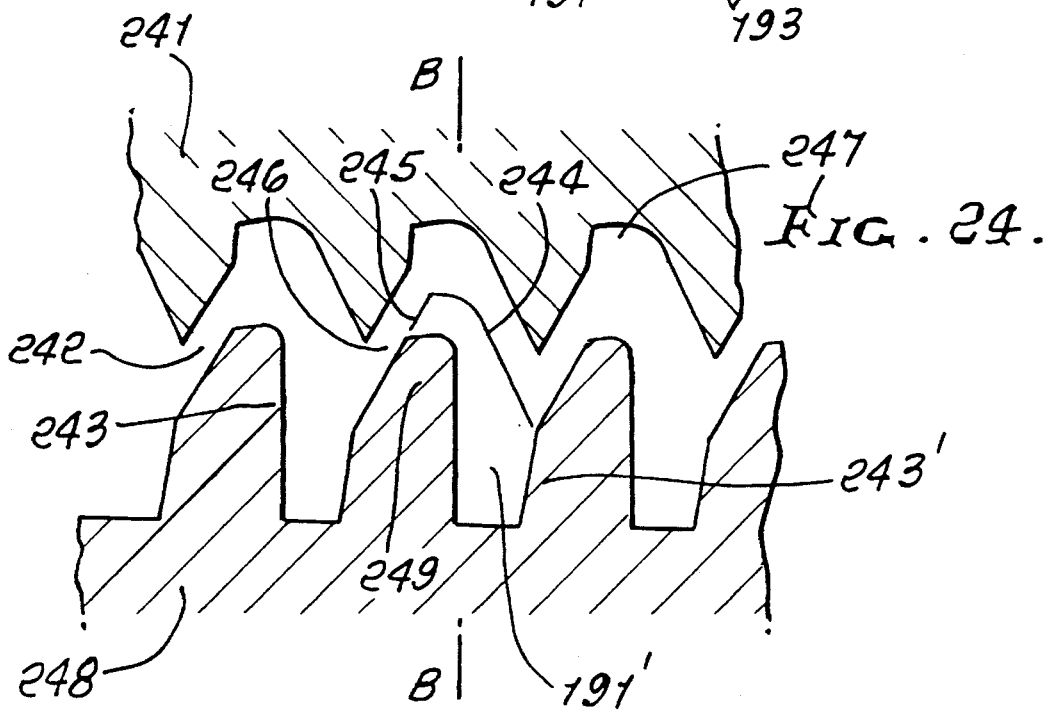

FIGS. 12(a)–12(d) are sections showing various ridge configurations;

FIGS. 13 and 14 are perspective views of modified connector elements with ratchet teeth;

FIG. 15 is a perspective view of a modified connector;

FIGS. 16–18 show objects mounting or carrying connectors, as referred to;

FIG. 19 is a perspective view of connector means with hooks for hook and loop-type connectors;

FIG. 20 is a view of a prior art hook;

FIGS. 21(a) and (b) are profile views of two improved hooks, as for hook and loop-type connectors;

FIG. 22 is a plan view of the FIG. 19 connector;

FIG. 23 is an enlarged section taken through a connector of FIG. 22;

FIG. 24 is a view like FIG. 10 showing mold parts separated and hook formation;

FIG. 25 is a section taken on lines B—B of FIG. 24 showing the mold parts closed together;

FIG. 26 is a perspective view of an improved double-ended, tongue-like ridge, with double buckles and ratchet-tightening design; and FIG. 26a is a perspective view of a connector.

DETAILED DESCRIPTION

Figure 1:
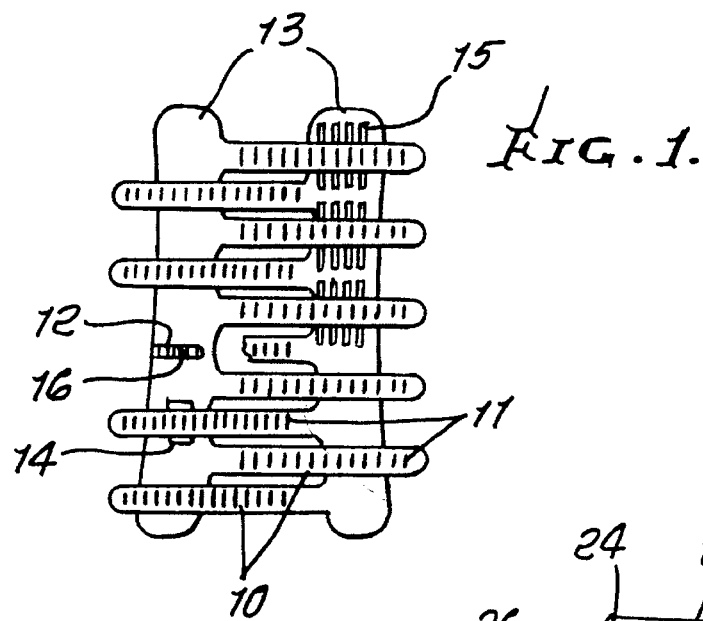
FIG. 1 is a plan view of one form of connector apparatus.

FIG. 1 shows a specialized connector used on a shoe, to replace laces. Note opposite alternate straps 10 at shoelace eyelet locations, with angled slots 11 through the straps (like slots 21 at FIG. 2, 21 at FIG. 3, and 65 at FIG. 7), which receive raised ridges 12 (like raised ridges 22 at FIG. 2, 22 at FIG. 3, and 72 and 73 at FIG. 7). The straps 10 extend laterally, while the connector members 13, holding the ridges 12, extend longitudinally in FIG. 1. There are holes 16 through the connector members 13. Ridges 12, holes and connector members 13 together form a web. Each connector member also carries straps 10, as shown. Each strap may be held in place or alignment with a C-shaped connector 14 (an example is shown in greater detail at 24 in FIGS. 2, 3 and 4) or with a hook-like ridge at 72 in FIG. 7. The ridges 12 may generally resemble the ridges 22 of FIGS. 2 and 3, or 72 and 73 of FIG. 7. Alternately, ridges 15 may occupy most of the connector members, as at 13. Ridges 15 may be of similar design, as ridge 141 of FIG. 14, while straps 10 carry downwardly projecting, raised ridges, as at 136 of FIG. 13. Strap 10 may, for example, be like straps at FIGS. 2, 6, 7, and 8.

Figure 2:
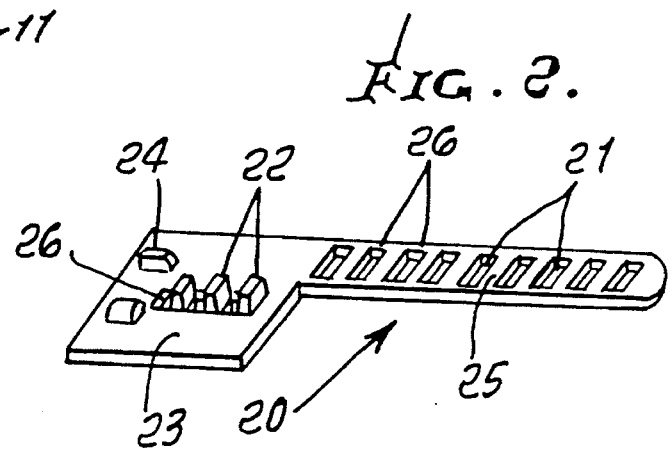
FIG. 2 is a perspective view of another form of the connector to be used as one of a pair, as at FIG. 5, 51 and 54.
Figure 5:
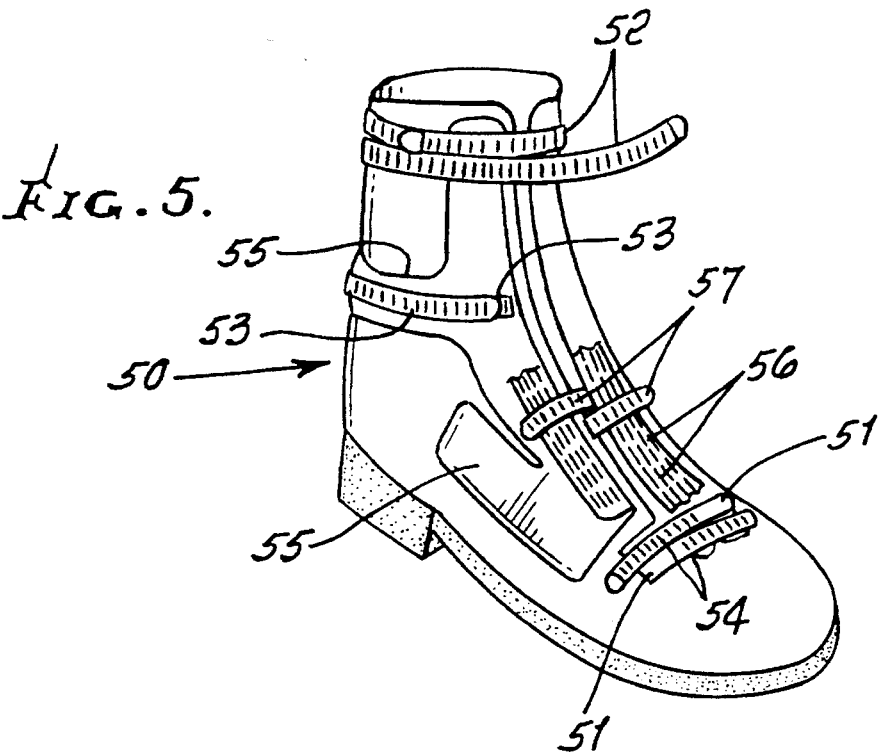
FIG. 5 is a perspective view of a boot, with connectors thereon.

FIG. 2 shows a connector of this invention which may be used for a shoe or boot, in the manner as indicated at 51 in FIG. 5; the strap 20 on base 23 has slanted slots or holes 21 which nest ridges 22 on another base 23, like that of FIG. 2, but rotated 180°. Slots 21 are formed by ridges 25 and connector members 26, which together form a web. Strap 20 on one base is partially held in place in C-shaped connector 24, on the other base or connector member 23, whereby a very secure dual connection is made, using two laterally oppositely extending straps 20, offset longitudinally.

Figure 3:
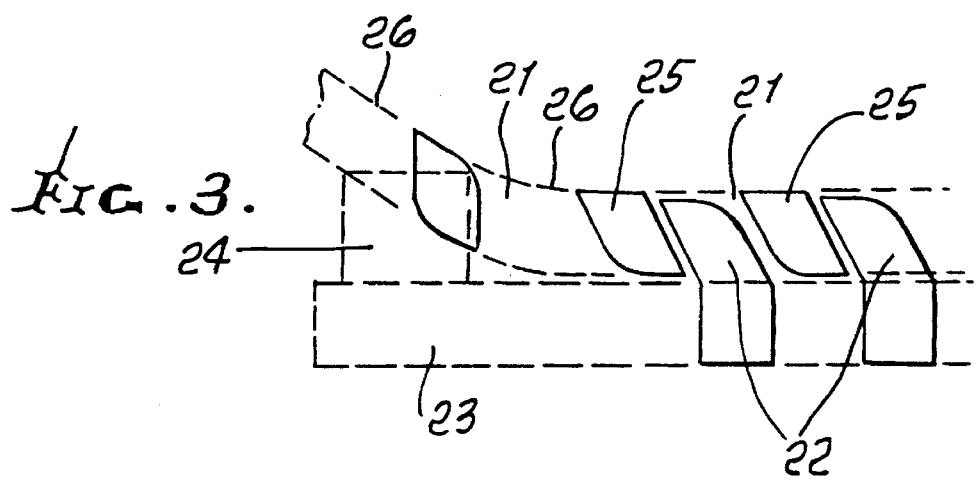
FIG. 3 is an enlarged schematic view showing meshing of ratchet-like ridges.
Figure 4:
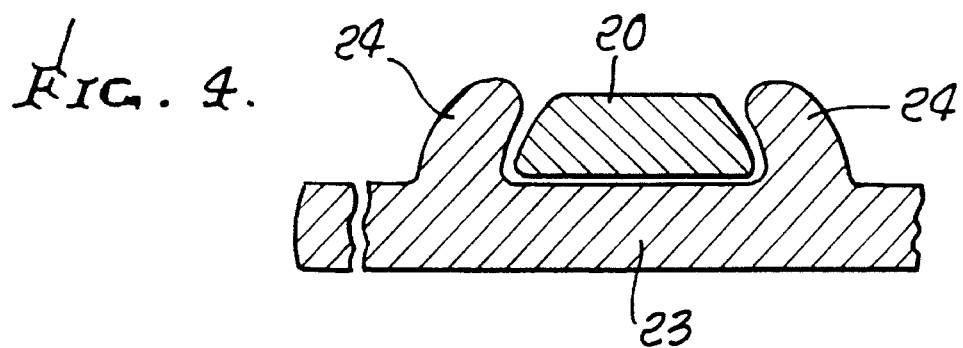
FIG. 4 is an enlarged section showing retention of a strap by a C-shaped connector.

FIG. 3 shows a cross-section view of strap 20 (like strap 11 of FIG. 1, or strap 20 of FIG. 4) having slots 21 defined by ridges 25 and connector member 26 engaged by ridges 22 (like ridges 12 of FIG. 1 or ridges 22 of FIG. 2), and in the process of being nested in C-shaped cross section 24, formed by lobes like 24 of FIG. 4, and 24 of FIG. 2. Ridges 22 and 25 are angled to allow ratchet-like tightening of straps.

FIG. 4 shows a cross section of C-shaped connector 24 (like 14 of FIG. 1, 24 of FIG. 2, and FIG. 3) with strap 20 (like strap 11 of FIG. 1) nested therein between lobes 24.

Accordingly, the flexible connector apparatus may be considered to comprise:

a) a plurality of parallel ridges spaced apart and configured to grip certain parallel ridges, b) a connector member supporting the ridges.

And, as shown, the first base has a first elongated and flexible tongue portion carrying downwardly projecting ridges, as at 25 of FIG. 3; and the second base has a second elongated and flexible tongue portion carrying similarly downwardly projecting ridges 25. Also, when used in the shoe of FIG. 5, the downwardly projecting ridges 25 of one connector engage the upwardly projecting ridges, as at 22 of FIGS. 2 and 3. Slots, as defined, may be formed by ridges.

Further, a C-shaped connector is provided on one base and guidedly nesting the straps of the other base to retain it in alignment relative to meshed ridges and slots.

FIG. 5 shows how forms of the connector may be used with a boot or shoe 50. For clarity, the boot 50 is shown partially assembled. The connector 51 may be either of the type shown at FIG. 2 or at FIG. 6. Alternately, instead of connectors with two connector straps 54, multiple strap connectors may be used, as at FIG. 1. Straps 54 of the connector 51 would be simultaneously pulled, as one would pull shoe laces to tighten the shoe. The upper connector straps 52 would operate simultaneously, and may be of designs, as shown at FIGS. 7, 8, 9, 13, 14, and 15 herein; straps 52 may be extended continuously around the shoe/boot or only partially. Ridges 56 may resemble raised, generally inflexible, ridges 72 or 73 of FIG. 7, or generally flexible ridges 151 of FIG. 15. Straps 57 can be used with downwardly projecting ridges, like 131 of FIG. 13 or 151 of FIG. 15. Straps 57 may have single or multiple rows of ridges. The connector 53, when tightened, creates pressure on the sealed bladder 55, which causes it to expand to make the shoe/boot a tighter fit. To this end, one or more straps may be used.

Figure 6:
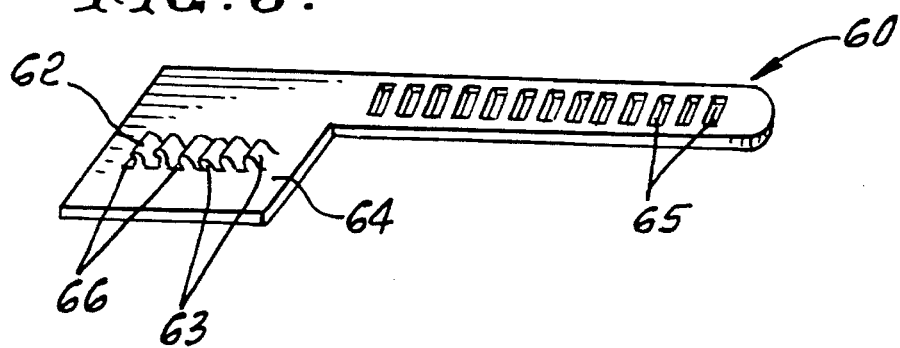
FIG. 6 is a view like that of FIG. 2 showing an alternative configuration.

FIG. 6 shows an alternate design to the connector shown at FIG. 2. The strap 60 has slots 65 (as at 65 in FIG. 7) which engage ridges on another connector, like ridges 62 and 63 on connector member 64 (like 72 and 73 of FIG. 7), the arrangement being like that of FIG. 1, without the need for the C-shaped connector 14.

Figure 7:
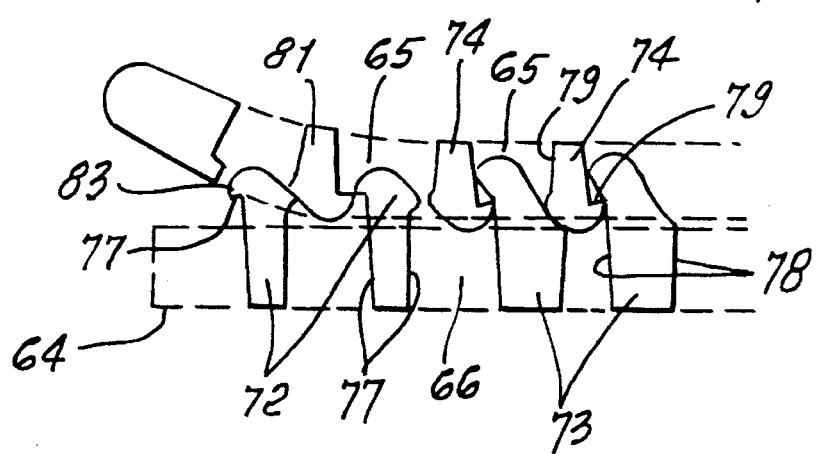
FIG. 7 is a view like FIG. 3 showing an alternative meshing of ridges and slots.

FIG. 7 is a cross section view of strap 60, with recessed ridges 74 and 81 engaging raised ridges 72 and 73, with connector member 64 extending beyond (like 13 of FIG. 1). Slots 65 are formed between ridges 74 and 81. Ridges 73 are used primarily for shear and ratchet-like connector adjustment. Accidental vertical disconnection is primarily controlled by nesting of ridges 74 and 81 with ridges 72. Note hook undercuts 77 and 79 of ridges. The spaces or slots 65 between ridges 74 and 81 are open. Also, the spaces 65 and 66 between ridges 74 and 81, and between ridges 72 and 73, are open, which creates greater flexibility of the strap 64. Spaces 65 and 66 allow the mold protrusion (111 of FIG. 11) to form the undercut portions 77, 78, and 79 of ridges 72, 73, 74, and 81, which create the overhangs.

As can be seen, ridges 72 and 73 are spaced apart so that very little, if any, mechanical spreading is required to nest ridges 74 and 81. Improved interlock of ridges is accomplished through the use of an improved overhang in the form of a chisel-like, sharp-edged, hook terminus 83. Ridge 80 is vertically held in place between ridges 73, because it is connected to strap 60 (beyond), which in turn is connected to ridge 81, which, when fully nested, locks ridge 80 under the overhang 82 of ridge 78. It is understood that ridges 72 or 73 may be used on a connector, a strap or other article, and may connect to other raised ridges, as at 72, or recessed ridges, as at 74 and 81.

Figure 8:
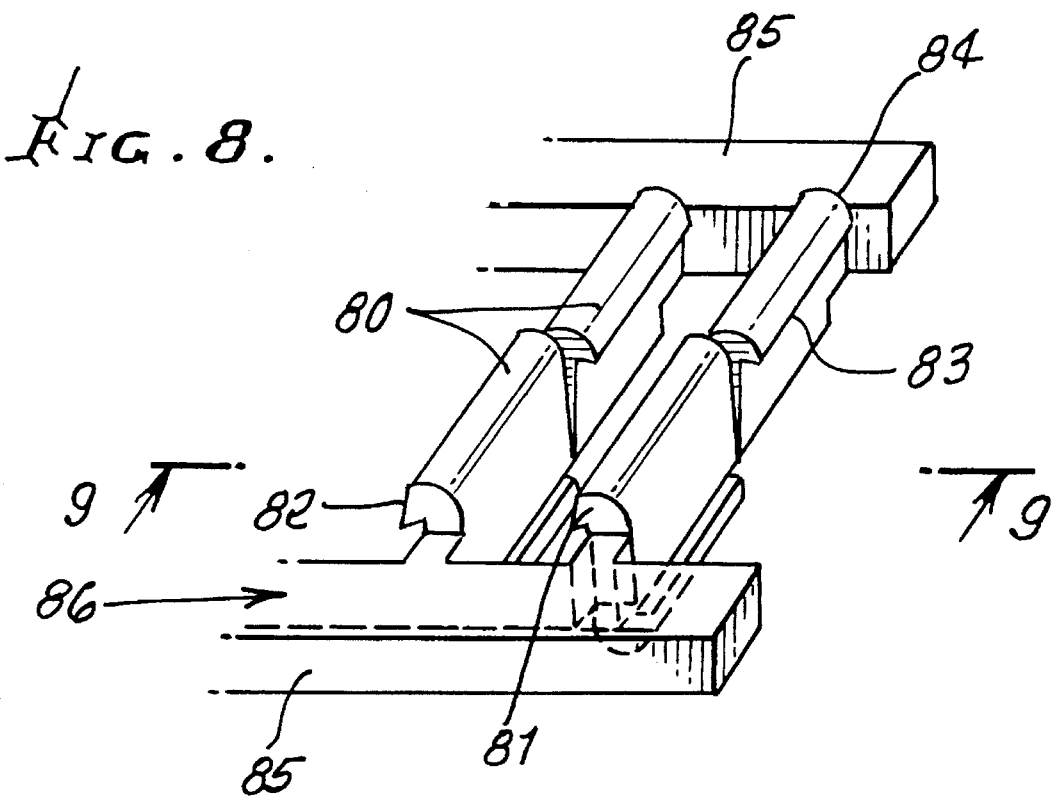
FIG. 8 is a perspective view of a strap-like connector with ridges spanning between two strap-like members.

FIG. 8 is a perspective view of a portion of a general utility strap 86, which may be used as at 52 and 53 of FIG. 5. Ridges 80 are double ended 81 and have hook termini 82 and 83 facing in opposite directions. A plurality of such ridges 80 extend longitudinally and are endwise connected at 84 to connector members 85. It is understood additional connector members 85 and ridges 80 may be added laterally. A third connector member may divide ridges 80 with hook termini 82 from ridges with hook termini 83.

Figure 9:
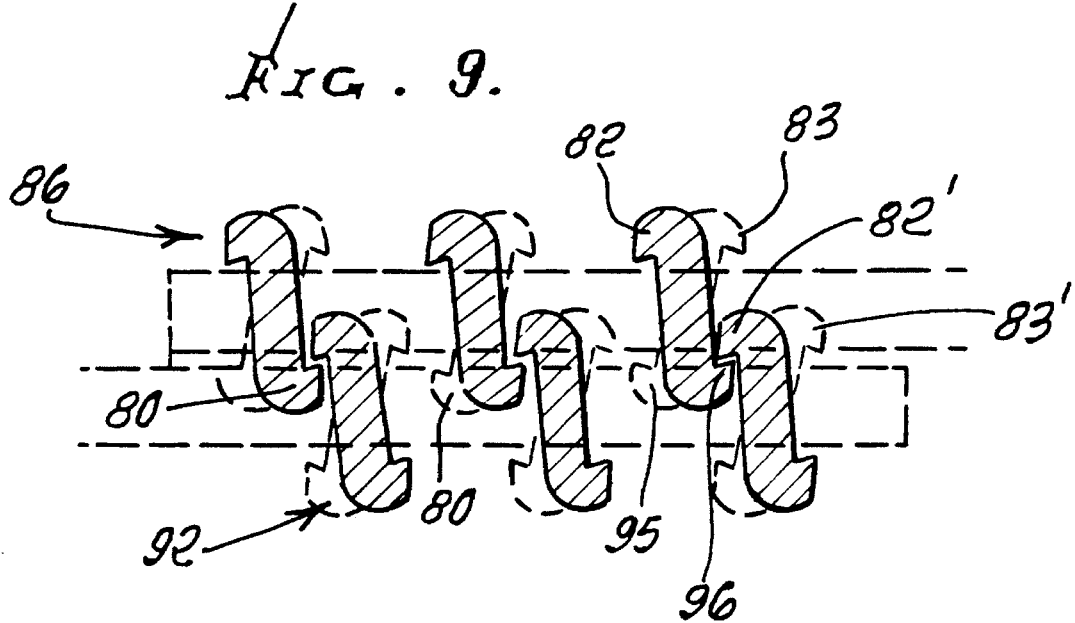
FIG. 9 is a section taken at 9—9 in FIG. 8 showing connection to a second strap-like connector.

FIG. 9 is a cross sectional view taken at 9—9 in FIG. 8 of connector 86, and showing a partial view of the FIG. 8 connector, connected to a similar connector 92. Note hook elements 82, 83, 95, and 96. When upper connector 86 is connected to lower connector 92, a hook element 96 of a connector 86 engages a hook element 82' of connector 92, in hooking relation. Although the ridges 80 are loosely nested, the hook elements 95 and 96 of connector 86 cooperate and are spaced for a tight fit during nesting, with similar hook elements 82' and 83' of connector 92, to prevent accidental disconnection of connectors 86 and 92 when nested. Desired disconnection is accomplished by peeling connectors 86 and 92 apart.

A random cut section of this type connector, with recessed ridges 80, may be press fitted to connect to a similar section of connector, either top or bottom, and have equal shear strength in two directions. At FIG. 8 the ends 81 of ridges 80 lock between connector members 85 and provide lateral shear strength. Where one way shear strength on one side of a strap is only needed, such as shoe connector 52 at FIG. 5, it should be understood hook termini 82 and 83 may face only in one direction; and ridges 80 may only be single ended.

FIG. 10 is a cross section view of two mold parts 100 and 101 in the process of separating, so that a gap 102 is exposed between the mold parts above the newly-formed or molded ridges 103. With injection molds, it is highly desirable that, when the mold part 103 is formed, the mold parts 100 and 101 may be perpendicularly separated in direction 97 without the part 103 being locked into either of the mold parts 100 and 101, due to overhangs, such as hooks 104. If hook 104 was formed by mold 100 at 105, ridge 103 could not be readily separated from mold 100. Because mold parts 100 and 101 come together side-by-side at 104 and 105, to form the chisel edge, there is a slight gap (between the two side-by-side molds), which allows air to escape and the hot molten plastic to be formed into a sharp chisel edge 104. The protrusions 106 and cavities 107 of mold part 100 cooperate with the protrusions 108 and cavities 109 of mold part 101, to mold double-ended ridge 103. Note plastic injection port 99, platen 99', and actuator 98 for mold part 100.

Figure 11:
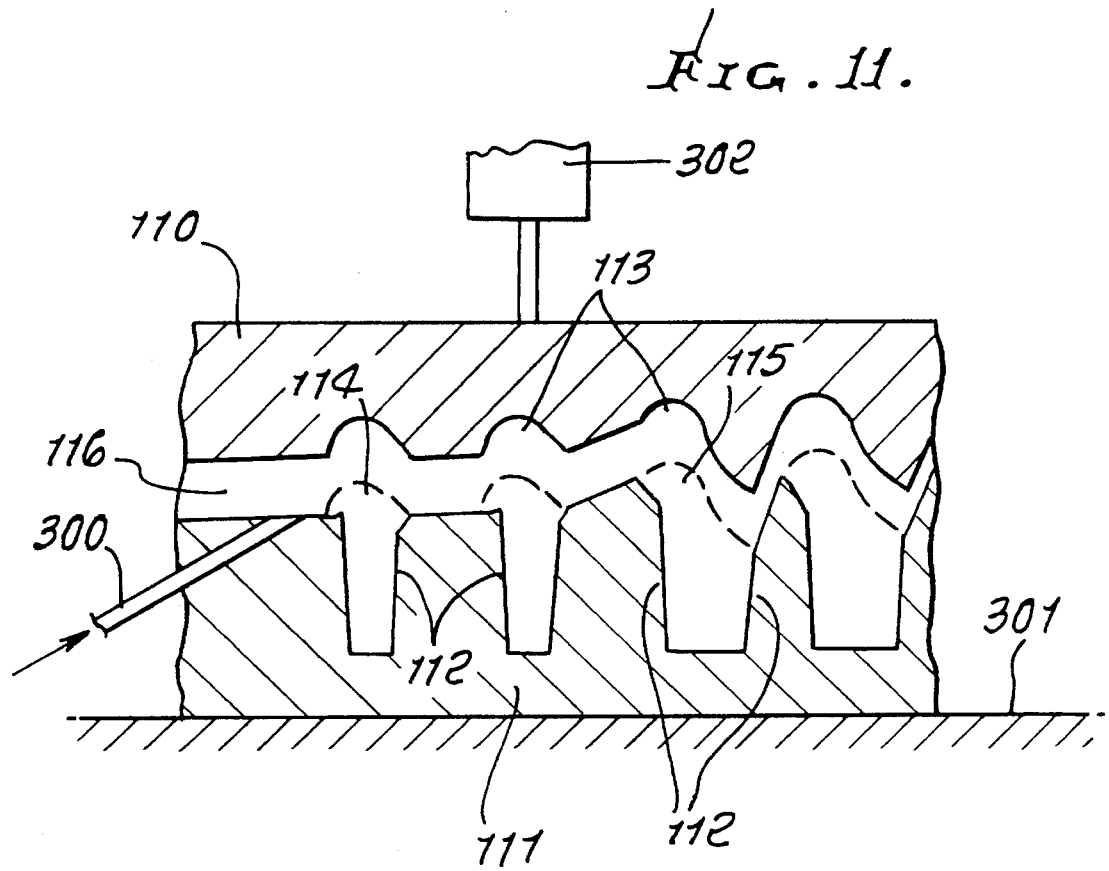
FIG. 11 is a view like FIG. 10 showing modified mold parts.
Figure 12A:
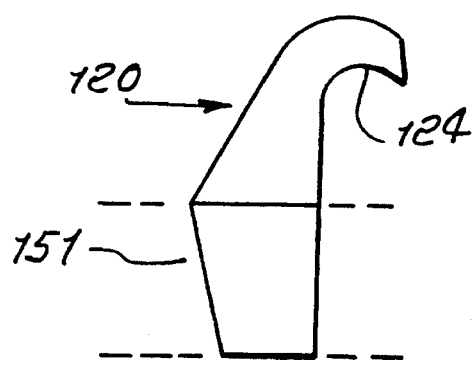
Figure 12B:
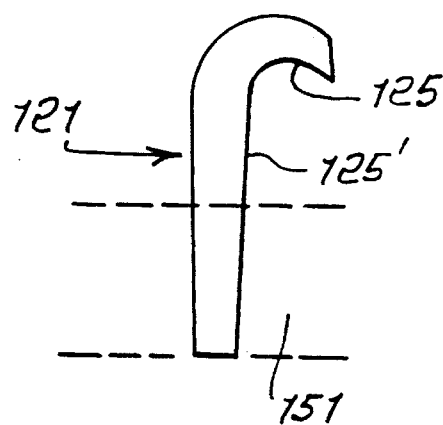
Figure 12C:
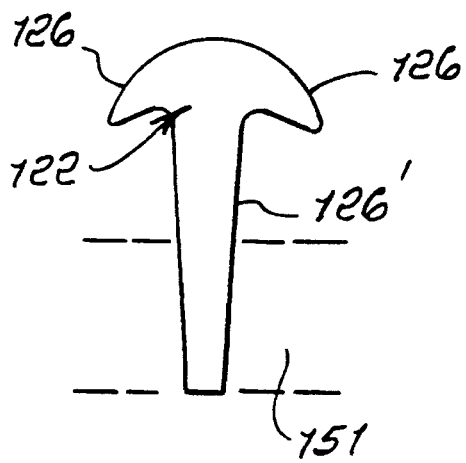
Figure 12D:
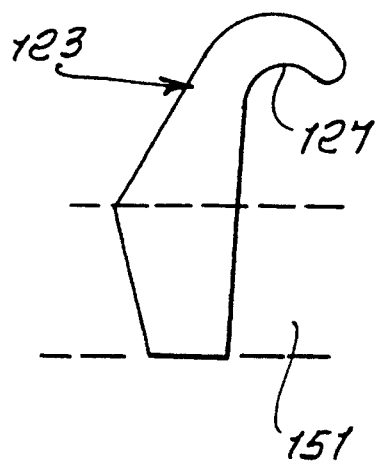
Figure 12E:
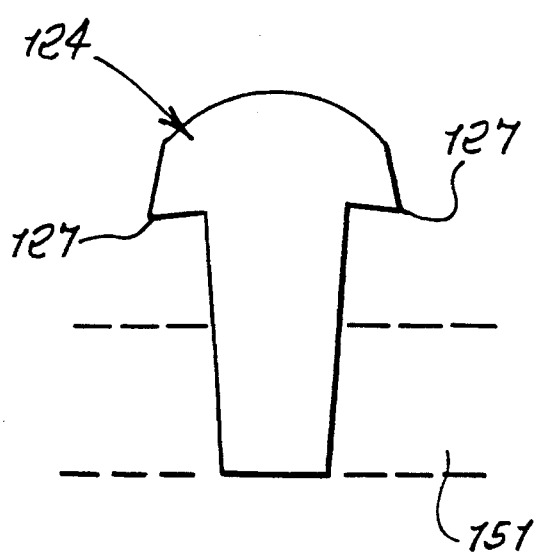

FIG. 11 is a cross section view of two modified mold parts 110 and 111 in the process of separating, so that a gap 116 is exposed above the tops of newly-formed ridges 114 and 115. The cavities 113 of mold part 110 cooperate with the protrusions 112 of mold part 111 to form the ridges 114 and 115. The protrusions 112 of mold part 111 will typically taper slightly, providing draft, so that the ridges can be vertically extracted. Likewise, the cavities 113 also taper or slope, so that there is little friction when separating the ridges 114 and 115. Molds of the type of FIG. 11 are suitable for strong, generally inflexible, ridges of FIGS. 1–4, 6, 7, 13, and 14; or generally flexible ridges of FIGS. 12 and 15. Note plastic injector 300, platen 301 and actuator 302 to open and close part 110.

FIGS 12(*a*)–12(*e*) are cross section views of examples of five ridge designs 120, 121, 122, 123, and 124, which can be molded by operation of mold parts 110 and 112 of FIG. 11. Ridges 120, 121, 122, and 123 are designed to flex during disengagement from nesting ridges at 120, 125, 126, 125', and 126'. Ridges 121 and 122 are configured to flex initially at 125' and 126', then flex and release at 125 and 126. Ridges are not connected to a base in the preferred embodiment, but only connected at the lateral ends 158 to connector members 157 and 157' which, together with the ridges 151 and 151', form a web 150, indicated for example at FIG. 15. Ridge 124, like ridge 141, FIG. 14, has minimal flex at the tip of chisel-like terminus 127.

FIG. 13 is a perspective view of a connector part 130 with ratchet-like, laterally extending teeth 132, spaced between longitudinally extending ridges 131, which are configured and spaced to nest with ridges 141 of connector part 140 of FIG. 14. A preferred embodiment would use ridge 124 instead of ridges 131 and 141, so that connector part 130 would have the same configuration as connector part 140. Ratchet-angled teeth 132 are configured for ratchet-like advancement relative to ratchet-like teeth 142 of FIG. 14, to resist relative movement of said bases in substantially parallel planes, and in direction parallel to length direction of the ridges. In both FIGS. 13 and 14, there are holes 133, 134, 143, and 144 which improve the flexibility of the connector parts 130 and 140, while allowing the forming of undercut portions 135 and 145 of the ratchet-like teeth 132 and 142, and the forming of the undercut portions 136 and 146 of ridges 131 and 141. Said holes 133, 134, 143, and 144, and undercuts 135, 136, 145, and 146 may be formed by protrusions, such as 112, of a mold part 111 of FIG. 11. Ridges 131 are supported by connector member 137 at their longitudinal ends 138.

FIG. 14, as explained under FIG. 13, is a part 140, configured to nest with part 130 of FIG. 13.

FIG. 15 is a perspective view of a portion of a connector part or web 150 having ridges 151 and 151', such as at FIG. 12(*a*), with hooks facing in one direction. The terminus hook portions 152 of these ridges 151 and 151' are configured to flexibly engage inverted nesting ridges 153, which are turned 180° relative to ridges 151 and 151', and then meet only slight resistance at 154 to achieve nesting at 155. See the broken lines indicating stages of relative movement. Ridges 151 and 151' are free-floating except where connected to connector members 157 and 157' at 158. The lateral space between ridges 151 and 151' generally equals the lateral width of the connector member 157' and is narrower than the lateral widths of ridges 151 and 151.' Ridges 151 and 151', together with connector member 157 and 157', form a web 150 Ridges 151 align laterally with the space 159 between ridges 151', to provide restricted lateral movement of nested ridges 155. In some preferred embodiments, ridges will be aligned laterally, as at 56 in FIG. 5. It is understood that connectors using a large multiple of connector members 157 and 157' with a large multiple of ridges 151 and 151' may be used instead of hook and loop-type connectors.

FIG. 16 shows a child's building block 160 and 160', which has multiple lateral and longitudinal elongated ridges 161 and 162 on the upper and lower portions of the body 160 and 160'. The ridges 161 and 162 are spaced to nest similarly spaced ridges on a similar block when ridges are aligned and press-fitted into spaces between ridges 168 and 168'.

Posts 163 of block portion 160' and interior side walls 164 are sized to connect to Leggo®-type toy blocks. Likewise, body 160 has three similarly configured posts 163' (one shown) and interior side walls (not shown). Peg 165 is sized to compression fit into holes 166 and 166' of posts 163 and 163', which are irregularly shaped, as at 167, so as to join body parts 160 and 160'.

Generally, rectangular ridges at FIGS. 16, 17, and 18 use generally inflexible plastic. A tight fit or slightly looser fit with protrusions 187 may be used for connection. In FIG. 17, the block forms a hole to receive the object with ridges thereon to be rotatable in the hole, the ridges rotating with the insert relative to the block. At FIG. 16, one peg may be used so as to rotate body part 160 relative body part 160'. At FIG. 18, outer edges 186 of ridges 161 may be slightly rounded to assist nesting.

FIG. 19 is a perspective view of a connector means 190 to engage loops, as in hook-and-loop connectors. Improved hooks 191 and 191' face in opposite directions and are free-floating except where laterally connected to connector members 192 and 193. Hooks 191 and 191' are width-wise very narrow at dimension W2, compared to the width of ridges of width dimension W1 of FIG. 15, so as to be able to engage loops. These hooks 191 and 191' are too narrow at W2 to effectively engage similar configured hooks. The spaces between hooks 191 and 191' are approximately equal to the lateral widths W3 of longitudinal connector members 193, at their point of connection with said connector members at 197. In the preferred embodiment, hooks 191 will taper from the narrowest widthwise dimension W2 to their connection with connector members 193 at 197.

FIG. 20 shows in profile view the hook 200 disclosed by Provost. Note the inner surface of hook 200 has a generally concave face 201 and outer, generally convex face 203, with a widened base 204 engaging a substantially planar carrier base member 205. The hook 206 tapers smoothly and continuously in width from the base member 204 to the rounded free end 207.

FIG. 21(a) and (b) show profile views of two improved hooks 210 and 210' of this invention. Hook 210 has a chisel-like, sharp-edged terminus at 211 configured to engage a larger percentage of loops than the rounded free end 206 of hook 200 of FIG. 20. The outer portion 207 of the free end 206 of hook 200 may allow a loop 208 to slip off and not engage. The sharp edged areas 211 and 211' of hooks 210 and 210' require less displacement and snap back of a loop 213 and 213' than loop 208. The upper and lower surfaces 212 and 212' of hooks 210 and 210' are generally parallel and do not need to taper for removal from the mold of this invention (see FIG. 24). Hook 210, as can be seen, does not continuously taper from its outer, sharp edged, free end 211 to its opposite terminus 214. There is no planar base member 205 or base member 204, as provided at FIG. 20. The hooks 210 and 210' are free floating to improve the flexibility of the web, which is made up of hooks 191 and 191' and connector member 193. As at FIG. 19, undercut surfaces 215 and 215' are slightly inwardly sloping to vertical, unlike at 201 of hook 200 of FIG. 20, to allow for clean, vertical separation of hook 244 from mold part 243, as at FIG. 24.

FIG. 22 is a plan view of the connector at FIG. 19. Note section A—A at FIG. 19 and in FIG. 22. The undercut portions 195 and 196 correspond to the mold portion 243 of FIG. 24, which is configured to form one undercut portion of ridge; while portion 243' is configured to form undercut portion 194.

FIG. 23 is a cross section view of a connector 220 also corresponding to section AA of FIG. 19, showing connector members 193 and 193' and hooks 191 and 191'. Note hooks 190 and 191, and connector member 193 and 193', has a slight taper which improves removal from mold cavities, as at FIG. 11, which also allows for greater flexibility of the hooks at W2, and a stronger, lower portion of ridge 191 and 191' at 197.

FIG. 24 is a cross section view of an upper mold part 241 partially separated 242 from lower mold part 248. A recently formed hook 191' is also shown. Proximate section B—B, the hook has a sharp, chisel-like, outer terminus 245. When the mold parts 241 and 248 come together at 246, a slight amount of air can vent at clearance 246 allowing the hot, molten plastic to form clean, sharp, chisel-like end 245. In the preferred embodiment, upper mold part 241 and cavity 247 has been etched by a wire EDM machine in a metal plate 241, while protrusions 249 of lower mold part cooperate to form ridge 244.

FIG. 25 is a cross section end view at section B—B of FIG. 24; however, mold parts 241 and 248 are shown together without gap at 246. Recently formed hooks 191 and 191' are shown. Cross section AA of FIG. 23 corresponds to hooks 191 and 191' and connector members 193.

Upper mold part 256 is made up of a series of metal plates 241, 257 and 259 which are locked together. Certain plates 257 are configured to form the top side of connector member 193. Other plates 259 are scribe to mirror image the upward facing portion of hooks 191. The mold part 241 of FIG. 24 will flair out, as at 260, where ridge is less than full height. The metal plate 261 viewed at 90° appears like mold part 248. Said flair of metal plates provides draft needed for meshing of upper 241 and lower 248 mold parts.

FIG. 26 shows an improved, tongue-like ridge 265 configured to adjustably nest in two buckles 266 and 266'. Holes 267 in 265 provide means for ratchet-like tightening of the connector when tongue 265 is pushed further into buckle 266 and 266'. Modified C-shaped connectors 268 (as seen in FIG. 26a) nest in each buckle-like housing 266 and 266'. The open ends 275 of said C-shaped connectors 268 align with the buckle end openings 269 and 269'; said C-shaped connectors 268 nest said tongue-like ridge 265; said C-shaped connector 268 is slightly bowed at 270, so that when its opposite side walls 271 and 271' are manually pinched, the bowed center 270 will flex upwardly for retracting ratchet tooth 272 upwardly, said ratchet tooth is shown in cross section at 272'. Multiple teeth 272 and 272' may be used or alternate ratchet means. Buckles 266 and 266' have side openings 273 and 273' to provide access to C-shaped connector 268 side walls 271 and 271'. Buckles 266 and 266' have slots 274 and 274' for a connecting strap, not shown. Tooth 272 ratchets in holes 267. Buckle 266' is like 266 and functions in the same way, but endwise oppositely.

I claim:

1. A connector means connectible to strap means, comprising in combination:
   a) a plurality of parallel ridges spaced apart and configured to have connection to said strap means,
   b) a connector web means supporting said ridges,
   c) said parallel ridges and said web means together forming a web,
   d) and including means associated with said connector means to confirm complete, adjusted interlock of said strap means with said parallel ridges,
   e) said connection having nesting looseness enabling press-together interfit of said ridges and strap means to provide a relatively strong such interfit, while also enabling peel disconnection of said interfit,
   f) and said interfit controlling relative lateral movement of said strap means.

2. The combination of the connector means of claim 1 with a strap means.

3. The combination of claim 2 wherein said strap means includes a web with holes configured to nest certain of said parallel ridges.

4. The combination of claim 3 wherein the holes in said web of said strap means are defined on two sides by recessed ridges.

5. The combination of claim 4 wherein each of the connector ridges has an outer terminal portion with cross section width and a ridge hook means, said hook means having approximately the width of the space formed between two ridges of said strap means.

6. The combination of claim 5 wherein the terminus of said ridge hook means is sharp edged and chisel like.

7. The combination of claim 6 wherein said inverted ridges of said strap means outer terminal portions are nested between certain of said parallel ridges, with the strap-like means of inverted ridge means flexible to accommodate release from said nesting, and said ridges being generally inflexible.

8. The combination of claim 2 wherein said connector means comprises a strap element.

9. The combination of claim 8 wherein said strap means is integral with said strap element.

10. The combination of claim 1 wherein said connector means to confirm completed adjusted interlock includes an auxiliary C-shaped cross section connector means associated with and configured perpendicular to said parallel ridges configured to nest said connector means.

11. The combination of claim 1 wherein certain of said ridges are configured to function as ratchet-like teeth.

12. The combination of claim 1 wherein at least one parallel ridge includes a ridge hook means.

13. The combination of claim 1 wherein a row of said parallel ridges extends longitudinally and including means associated with said connector means to control lateral movement of said parallel ridges.

14. The combination of claim 1 wherein said parallel ridges have undercut portions and there are openings through the web of the connector between certain of said parallel ridges associated with the undercut portions of said parallel ridges.

15. The combination of claim 1 wherein at least one of said parallel ridges has a generally pointed ridge hook means, while other ridges lack ridge hook means.

16. A connector means connectible to strap means, comprising in combination:
 a) a plurality of parallel ridges spaced apart and configured to connect to said strap means, said parallel ridges having a plurality of ridge hook termini,
 b) a connector web means supporting said ridges,
 c) said parallel ridges and said web means together forming a web,
 d) and including means associated with said connector means to confirm complete, adjusted interlock of said strap means with said parallel ridges,
 e) and wherein a plurality of said parallel ridges are spaced and configured to allow relatively loose nesting of said strap means with said parallel ridges which extend laterally, and including means to control lateral movement of said strap means.

17. Connector means connectible to inverted ridge means, comprising:
 a) a plurality of parallel ridges spaced apart and configured to grip inverted ridge means nested between certain of said parallel ridges,
 b) said parallel ridges being generally inflexible,
 c) said parallel ridges each having side walls, and a top and bottom in cross section normal to ridge length, and wherein said cross section is generally rectangularly shaped,
 d) and including means associated with said connector means to confirm complete, adjusted interlock in response to said nesting,
 e) and including an object to which said connector means is connected,
 f) said parallel ridges having a plurality of ridge hook terminus means.

18. A connector means comprising in combination:
 a) a plurality of ridges spaced apart and configured to grip inverted ridge means nested between certain of said ridges,
 b) at least some of said ridges being parallel and having cross section means, with associated ridge hook terminus means, configured to connect with said inverted ridge means,
 c) a connector web means supporting said ridges,
 d) said ridges and said web means together forming a web,
 e) and including means associated with said ridges to confirm adjusted interlock of said ridges with said inverted ridge means.

19. The connector means of claim 18, which is connected to an object, and wherein said object is a shoe.

20. A shoe incorporating the connector means of claim 18 and having a partially inflated, sealed bladder, and wherein said connector means is tightened so as to apply external pressure to said bladder so that the internal pressure of the bladder is increased to tighten the fit of said shoe.

21. The combination of claim 18 wherein the ridges are characterized by at least one of the following elements:
 C-shaped
 angular
 slanting
 sloping
 curved
 undercut
 flat
 pointed
 rectangular
 hook
 chisel-like hook
 recessed
 double ended.

22. The combination of claim 18 wherein said nesting of the ridge means and said inverted ridge means is characterized by one of the following:
 loose interfit
 tight interfit.

23. The combination of claim 18 wherein said ridges have chisel-like hook means and wherein said ridges are characterized by the following:
 tight interfit while being nested
 loose interfit after being nested.

24. The combination of claim 18 wherein there are ridge hook terminus means on both sides of a web.

25. The combination of claim 18 wherein said parallel ridges have ridge hook terminus means facing two directions.

26. The connector of claim 18 wherein said object is a boot.

27. A connector means comprising:
 a) a plurality of ridges spaced apart and configured to grip inverted ridge means nested between certain of said ridges,
 b) at least some of said ridges having cross section means configured to connect with said inverted ridge means,
 c) a connector web means supporting said ridges,
 d) said ridges and said web means together forming a web,
 e) and including means associated with said ridges to confirm adjusted interlock of said ridges with said inverted ridge means,
 f) and wherein there are a plurality of offset rows of parallel ridges configured so that nested, inverted, ridge means are blocked from lateral movement by said offset ridges.

28. A connector means comprising:
    a) a plurality of ridges spaced apart and configured to grip inverted ridge means nested between certain of said ridges,
    b) at least some of said ridges having cross section means configured to connect with said inverted ridge means,
    c) a connector web means supporting said ridges,
    d) said ridges and said web means together forming a web, e) and including means associated with said ridges to confirm adjusted interlock of said ridges with said inverted ridge means,
    f) and wherein there are a plurality of parallel ridges at opposite sides of a mid-region, and further characterized by at least one of the following:
        i) the mid-region is free of said ridges,
        ii) the ridges are parallel to said midsection,
        iii) there is ratchet tooth means in said mid-region,
        iv) said connector means is configured to connect to another connector with inverted ridge means which, when connected, allow ratchet-like connected movement of one connector relative to the other.

29. A connector means comprising:
    a) a plurality of ridges spaced apart and configured to grip inverted ridge means nested between certain of said ridges,
    b) at least some of said ridges having cross section means configured to connect with said inverted ridge means,
    c) a connector web means supporting said ridges,
    d) said ridges and said web means together forming a web,
    e) and including means associated with said ridges to confirm adjusted interlock of said ridges with said inverted ridge means,
    f) and wherein said parallel ridges have a plurality of ridge hook terminus means.

30. Connector means connectible to inverted ridge means having inverted ridges, comprising:
    a) a plurality of parallel ridges spaced apart and configured to grip inverted ridge means nested between certain of said parallel ridges,
    b) said parallel ridges being configured to allow random press fitting with automatic alignment for nesting of said inverted ridge means ridges, said parallel ridges having a plurality of ridge hook terminus means,
    c) and including means associated with said connector means to confirm complete, adjusted interlock of said inverted ridge means with said parallel ridges in response to said nesting,
    d) and including an object to which said connector means is connected.

31. A connector means connectible to a plurality of fiber loops comprising:
    a) a plurality of hooks spaced apart and configured to grip loops of a loop fastener by certain of said hooks,
    b) said hooks having an upwardly projecting outer surface, which, in cross section, generally is characterized by a convex portion, with generally straight portions on either side, a downwardly projecting undercut portion, which in cross section is generally characterized by a concave portion with generally straight portions on either side, the lower straight portion of said undercut portion extending to the lower terminus of said hook and being generally perpendicular, relative the upper surface of said connector members, said undercut portions configured to grip said fiber loops,
    c) a plurality of parallel connector members,
    d) said hooks having a free end, outermost portion, and opposite lower terminus portion with free front, back and bottom surfaces, with two lateral end portions connected to and supported by said parallel connector members,
    e) said hooks and said parallel connector members together forming a flexible web, said web being said connector means,
    f) and wherein there are holes formed by said hooks and parallel connector members through said connector means adjacent to and in alignment with said concave undercut means which improve the flexibility of the connector.

32. The connector of claim 28 wherein said outermost portions have double hook means.

33. The connector of claim 31 wherein the hook terminus is characterized by at least one of the following:
    a) pointed and downwardly projecting,
    b) chisel-like,
    c) reduced lateral displacement of loops required for engagement.

34. Flexible connector apparatus comprising:
    a) a first base, first ridges in a first row on the first base, and first slots in a second row on the first base, said first and second rows extending in substantially parallel and offset relation,
    b) a second base, second ridges in third row on the second base, and second slots in a fourth row on the second base, said third and fourth rows extending in substantially parallel and offset relation,
    c) the first ridges located to mesh with the second slots, and the second ridges located to mesh with the first slots,
    d) said connector apparatus having nesting looseness when said ridges mesh with said slots, enabling press-together interfit of said ridges and slots, to provide a relatively strong such interfit, while also enabling peel disconnection of said interfit, said interfit controlling lateral movement of said first base.

35. The apparatus of claim 34 including carrier means carrying said bases.

36. The apparatus of claim 35 including a shoe having an upper defining said carrier means in the form of two flaps positioned to be held together when said first and second ridges mesh with said second and first slots, respectively.

37. The apparatus of claim 34 wherein said slots are defined by auxiliary ridges having slot forming gaps therebetween.

38. The apparatus of claim 37 including ridge interlocking overhang means, with sharp edge termini.

39. The apparatus of claim 37 wherein said auxiliary ridges define mutually interengageable hook means.

40. The apparatus of claim 39 wherein the ridges define adjacent rows of hooks facing in opposite directions.

41. The apparatus of claim 34 including a C-shaped connector on each base and guidedly nesting the straps of the other base, to retain it in alignment relative to meshed ridges and slots.

42. The apparatus of claim 34 including ratchet teeth on said bases and interengageable to resist relative movement of said bases, in substantially parallel planes.

43. The apparatus of claim 34 wherein said ridges have hook-shaped free ends with sharp edged termini.

44. Flexible connector apparatus comprising:
   a) a first base, first ridges in a first row on the first base, and first slots in a second row on the first base, said first and second rows extending in substantially parallel and offset relation,
   b) a second base, second ridges in third row on the second base, and second slots in a fourth row on the second base, said third and fourth rows extending in substantially parallel and offset relation,
   c) the first ridges located to mesh with the second slots, and the second ridges located to mesh with the first slots,
   d) and including carrier means carrying said bases,
   e) and wherein said first base has a first elongated and flexible tongue portion carrying first slots, and said second base has a second elongated and flexible tongue portion carrying second slots.

45. Flexible connector apparatus comprising:
   a) a first base, first ridges in a first row on the first base, and first slots in a second row on the first base, said first and second rows extending in substantially parallel and offset relation,
   b) a second base, second ridges in third row on the second base, and second slots in a fourth row on the second base, said third and fourth rows extending in substantially parallel and offset relation,
   c) the first ridges located to mesh with the second slots, and the second ridges located to mesh with the first slots,
   d) and wherein there is a plurality of said first bases joined together laterally for forming a first base means, a plurality of said second bases joined together laterally for forming a second base means, each base means having a plurality of tongues.

46. Connector means including:
   a) a generally flat, flexible base means,
   b) a plurality of protuberances spaced apart and projecting from said base means,
   c) said protuberances having undercut means relative to said base means configured to allow said protuberances to grip during connection, said protuberances defining parallel ridges having a plurality of ridge hook terminus means,
   d) said undercut means being further characterized in that it is in alignment with perforations through said base means, and wherein said perforations generally improve the flexibility of said base means,
   e) said perforation means and undercut means being aligned so as to allow mold protrusion means to simultaneously form said perforation means and undercut means.

47. Connector means connectible to buckle means, comprising:
   a) tongue means,
   b) said tongue means having perforations, said perforations being tongue ratchet adjustable lock means, said perforations configured to allow multiple connection locations and ratchet tightening,
   c) said tongue means being configured to flexibly fit into buckle means having buckle ratchet adjustable lock means, a first opening means to first nest said tongue means, and second tongue opening means configured to allow greater interlock ratchet-like adjustment of said tongue through said buckle means and said first and second opening means,
   d) said ratchet adjustable lock means configured to allow ratchet-like tightening of the tongue means in two directions in cooperation with a pair of said buckle means,
   e) said connector means having nesting looseness when said buckle ratchet adjustable lock means meshes with said tongue means perforations enabling press together interfit of said tongue means and buckle means, to provide a relatively strong such interfit, while also enabling flexible disconnection of said interfit.

48. Connector means connectible to buckle means, comprising:
   a) tongue means,
   b) said tongue means having perforations, said perforations being tongue ratchet adjustable lock means, said perforations configured to allow multiple connection locations and ratchet tightening,
   c) said tongue means being configured to flexibly fit into buckle means having buckle ratchet adjustable lock means, a first opening means to first nest said tongue means, and second tongue opening means configured to allow greater interlock ratchet-like adjustment of said tongue through said buckle means and said first and second opening means,
   d) and wherein said buckle means comprises:
      i) buckle means having recess means, said recess means having buckle ratchet adjustable lock means,
      ii) said buckle means having a top and bottom, and side wall means, said side wall means having a mid-section, said mid-section configured to allow manual release of said buckle ratchet adjustable lock means, so as to unlock tongue means,
      iii) said buckle means including first opening means wherein said tongue means is flexibly fitted into said recess means,
      iv) said buckle means including second opening means wherein said tongue means may be extended through said recess means and through said second opening means to allow greater ratchet-like, adjustable interlock,
      v) said buckle means including means to connect to a strap,
      vi) and wherein said tongue means is fitted into said buckle means to complete adjustable connection.

49. The combination of claim 48 wherein said buckle ratchet, adjustable lock means in cross section has a modified C-shaped profile configured to flex when outside walls thereof are pressed, so as to withdraw ratchet tooth means from said tongue perforations.

50. A connector means comprising:
   a) a plurality of ridges spaced apart and configured to grip inverted ridge means nested between certain of said ridges,
   b) at least some of said ridges having cross section means configured to connect with said inverted ridge means,
   c) a connector web means supporting said ridges,
   d) said ridges and said web means together defining a strap,
   e) and including means associated with said ridges to confirm adjusted interlock of said strap ridges with said inverted ridge means, f) and wherein said connector means is connected to an object and including said object having said connector means, g) said connector means having nesting looseness enabling press-together interfit of said strap ridges and inverted ridge means to provide a relatively strong such interfit, while also enabling peel disconnection of said interfit, h) said interfit controlling relative lateral movement of said strap means.

51. A connector means connectible to strap means, comprising:

a) a plurality of parallel ridges spaced apart and configured to connect to said strap means, said parallel ridges having a top and a bottom, two sides and two ends, at least one side having undercut means configured as connector elements, b) connector member means supporting said parallel ridge ends, c) holes through said connector means generally in alignment with said undercut means configured to allow means to form said undercut means, d) said parallel ridges, holes and said connector member means together forming a web, e) and including means associated with said connector means to confirm complete, adjusted interlock of said strap means with said parallel ridges, f) said connector means and strap means providing nesting looseness enabling press-together of said parallel ridges and strap means to provide a relatively strong such interfit, while also enabling peel disconnection of said interfit, g) said interfit controlling relative lateral movement of said strap means.

52. A shoe connector means connectible to shoe strap means, comprising:

a) a plurality of parallel ridges spaced apart and configured to connect to said shoe strap means, b) a connector web means supporting said ridges, c) said parallel ridges and said web means together forming a web, d) and including means associated with said shoe connector means to confirm complete, adjusted interlock of said shoe strap means with said parallel ridges, e) and including a shoe to which said connector means is connected, f) and wherein a plurality of said parallel ridges are spaced and configured to allow nesting of strap ridges with said parallel ridges, and including means to control lateral movement of said strap ridges, g) said shoe connector means and strap means providing nesting looseness enabling press-together of said parallel ridges and said shoe strap means to provide a relatively strong such interfit, while also enabling peel disconnection of said interfit, h) said interfit controlling relative lateral movement of said strap means.

53. Connector means connectible to inverted ridge means, comprising:

a) a plurality of parallel ridges spaced apart and configured to grip inverted ridge means nested between certain of said parallel ridges, b) said parallel ridges being generally inflexible, c) said parallel ridges each having generally parallel side walls, and a top and bottom in cross section normal to ridge length, d) the space between the side walls of parallel ridges being approximately the cross section width of inverted ridge means configured to nest therein, e) and including compression fit means associated with said parallel ridges to confirm complete, adjusted interlock in response to said nesting, f) and including an object to which said connector means is connected, g) said connector means and inverted ridge means providing looseness enabling press-together interfit of said parallel ridges and said inverted ridge means to provide a relatively strong such interfit, while also enabling peel disconnection of said interfit, h) said interfit controlling relative lateral movement of said strap means.

54. A connector means comprising:

a) a plurality of ridges spaced apart and configured to grip inverted ridge means nested between certain of said ridges, b) at least some of said ridges being parallel and having cross section undercut means configured to connect with said inverted ridge means, c) a connector member means supporting said ridges, d) holes through said connector means generally in alignment with said undercut means, e) said ridges, holes and said connector member means together forming a web, e) and including means associated with said ridges to confirm adjusted interlock of said ridges with said inverted ridge means, f) said ridges and said inverted ridge means having looseness enabling press-together interfit of said ridges and inverted ridge means to provide a relatively strong such interfit, while also enabling peel disconnection of said interfit, g) said interfit controlling relative lateral movement of said strap means.

55. The connector means of claim 54 wherein said connector means is connected to an object, and wherein said object is a shoe.

56. A shoe incorporating the connector means of claim 54 and having a partially inflated, sealed bladder, and wherein said connector is tightened so as to apply external pressure to said bladder so that the internal pressure of the bladder is increased to tighten the fit of said shoe.

57. The connector means of claim 54 wherein at least some ridges nest in said holes.

58. The connector means of claim 54 wherein said ridges have chisel-like hook means and wherein said ridges are characterized by the following:

tight interfit while being nested loose interfit after being nested nesting in said holes.

59. The connector of claim 54 wherein there are ridge hook terminus means on both sides of a web.

60. The connector of claim 54 wherein said connector has ridge hook terminus means facing two directions on both sides of a web.

61. The connector means of claim 54 wherein said connector is connected to an object and wherein said object is a boot.

62. The connector means of claim 54 including inverted ridge means having recessed ridges, and wherein at least some of said parallel ridges nest in holes formed by said recessed ridges.

63. A connector means comprising:

a) a plurality of ridges spaced apart and configured to grip inverted ridge means nested between certain of said ridges, b) at least some of said ridges being parallel and having cross section undercut means configured to connect with said inverted ridge means, c) a connector means supporting said ridges, d) holes through said connector means generally in alignment with said undercut means, e) said ridges, holes and said connector member together forming a web, f) and including means associated with said ridges to confirm adjusted interlock of said ridges with said inverted ridge means, g) and wherein there are a plurality of offset rows of parallel ridges configured so that nested, inverted, ridge means are blocked from lateral movement by said offset ridges.

64. A connector means comprising:

a) a plurality of ridges spaced apart and configured to grip inverted ridge means nested between certain of said ridges, b) at least some of said ridges having cross section undercut means configured to connect with said inverted ridge means, c) a connector member means supporting said ridges, d) holes through said connector means generally in alignment with said undercut means, e) said ridges, holes and said web means together forming a web, f) and including means associated with said ridges to confirm adjusted interlock of said ridges with said inverted ridge means, g) and wherein there are a plurality of parallel ridges at opposite sides of a mid-region, and further characterized by at least one of the following:
  i) the mid-region is free of said ridges,
  ii) the ridges are parallel to said midsection,
  iii) there is ratchet tooth means in said mid-region,
  iv) said connector means is configured to connect to another connector with inverted ridge means which, when connected, allow ratchet-like connected movement of one connector relative to the other.

65. Connector means including:

a) a generally flat, flexible base means, b) a plurality of protuberances spaced apart and projecting from said base means, c) said protuberances having undercut means relative to said base means configured to allow said protuberances to grip during connection, d) said undercut means being further characterized in that it is in alignment with holes through said base means, and wherein said holes generally improve the flexibility of said base means, e) said holes and undercut means being aligned so as to allow mold protrusion means to simultaneously form said holes and undercut means, f) said connector means having nesting looseness when said protuberances mesh enabling press together interfit of said protuberances, to provide a relatively strong such interfit, while also enabling flexible peel disconnection of said interfit.

66. Connector means connectible to buckle means, comprising:

a) tongue means, b) said tongue means having perforations, said perforations being tongue ratchet adjustable lock means, said perforations configured to allow multiple connection locations and ratchet tightening, c) said tongue means being configured to flexibly fit into buckle means having buckle ratchet adjustable lock means, a first opening means to first nest said tongue means, and second tongue opening means configured to allow greater interlock ratchet-like adjustment of said tongue through said buckle means and said first and second opening means, d) said connector means having nesting looseness when said buckle ratchet adjustable lock means meshes with said tongue means perforations enabling press together interfit of said tongue means and buckle means, to provide a relatively strong such interfit, while also enabling flexible disconnection of said interfit e) said interfit controlling relative lateral movement of said tongue means.

67. A tongue and buckle connector, comprising:

a) a buckle having a recess, b) a tongue having perforations, said perforations being tongue ratchet adjustable lock means, said perforations configured to allow multiple connection locations and ratchet tightening, c) said tongue being configured to flexibly fit into the buckle having a buckle ratchet adjustable lock, a first opening to first nest said tongue, and a second tongue opening configured to allow greater interlock ratchet-like adjustment of said tongue through said buckle and said first and second openings, d) and wherein:
  i) the buckle recess contains said buckle ratchet adjustable lock,
  ii) said buckle having a top and bottom, and side walls, said side walls having a mid-section, said mid-section configured to allow manual release of said buckle ratchet adjustable lock, so as to unlock the tongue,
  iii) said tongue being flexibly fitted into said buckle recess,
  iv) said buckle including a second opening wherein said tongue may be extended through said recess and through said second opening to allow greater ratchet-like, adjustable interlock,
  v) said buckle including means to connect to a strap.

* * * * *